(12) United States Patent
Ishii et al.

(10) Patent No.: US 12,331,406 B2
(45) Date of Patent: Jun. 17, 2025

(54) METALLIC COATED STEEL

(71) Applicant: NIPPON STEEL CORPORATION, Tokyo (JP)

(72) Inventors: Kotaro Ishii, Tokyo (JP); Kohei Tokuda, Tokyo (JP); Yasuto Goto, Tokyo (JP); Mamoru Saito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/840,411

(22) PCT Filed: Feb. 22, 2023

(86) PCT No.: PCT/JP2023/006599
§ 371 (c)(1),
(2) Date: Aug. 21, 2024

(87) PCT Pub. No.: WO2023/163075
PCT Pub. Date: Aug. 31, 2023

(65) Prior Publication Data
US 2025/0109475 A1    Apr. 3, 2025

(30) Foreign Application Priority Data
Feb. 22, 2022   (JP) ................. 2022-025405

(51) Int. Cl.
*C23C 2/06* (2006.01)
*C22C 18/00* (2006.01)

(52) U.S. Cl.
CPC ................ *C23C 2/06* (2013.01); *C22C 18/00* (2013.01); *Y10T 428/12799* (2015.01)

(58) Field of Classification Search
None
See application file for complete search history.

(56) References Cited

U.S. PATENT DOCUMENTS 6,235,410 B1    5/2001  Komatsu et al.
6,465,114 B1 *  10/2002 Honda .................. C23C 28/023
                                                428/626
(Continued)

FOREIGN PATENT DOCUMENTS

CN    110234780 A    9/2019
JP    10-226865 A    8/1998
(Continued)

OTHER PUBLICATIONS

Written Opinion of the International Searching Authority for PCT/JP2023/006599 (PCT/ISA/237) mailed on Apr. 25, 2023.

*Primary Examiner* — Seth Dumbris
(74) *Attorney, Agent, or Firm* — Birch, Stewart, Kolasch & Birch, LLP

(57) ABSTRACT

This metallic coated steel includes a steel material and a metallic coating layer. The metallic coating layer has an average chemical composition including Al: 0.2% to less than 4.0%, Mg: more than 4.0% and less than 12.5%, Ca: 0.15% to less than 3.00%, Zn: 65% or more, and impurities. In an any perpendicular cross section (in a thickness direction) in the metallic coating layer, a metallurgical structure observed in a scanning electron microscope observed visual field contains, in terms of area fraction, an $MgZn_2$ phase: 10 to 40%, an Al—Zn phase: 0 to 15%, an Al phase: (Zn<10%): 0 to 5%, a $CaZn_{13}$ phase: 1.0 to 15%, and a total of a [ternary eutectic structure of $Al/MgZn_2/Zn$] and a [binary eutectic structure of $MgZn_2/Zn$]: 30% or more.

4 Claims, 1 Drawing Sheet

(56) References Cited

U.S. PATENT DOCUMENTS

| | | | |
|---|---|---|---|
| 10,982,303 B2* | 4/2021 | Tokuda | C22C 38/00 |
| 2018/0002797 A1 | 1/2018 | Oh et al. | |
| 2018/0265955 A1* | 9/2018 | Shimoda | B32B 15/20 |
| 2020/0002798 A1 | 1/2020 | Tokuda et al. | |
| 2020/0002803 A1 | 1/2020 | Kwak et al. | |
| 2021/0039354 A1 | 2/2021 | Tokuda et al. | |
| 2022/0298646 A1 | 9/2022 | Mitsunobu et al. | |

FOREIGN PATENT DOCUMENTS

| | | |
|---|---|---|
| JP | 2000-104154 A | 4/2000 |
| JP | 2018-506644 A | 3/2018 |
| JP | 2020-504781 A | 2/2020 |
| WO | WO 2019/180852 A1 | 9/2019 |
| WO | WO 2021/039973 A1 | 3/2021 |

* cited by examiner

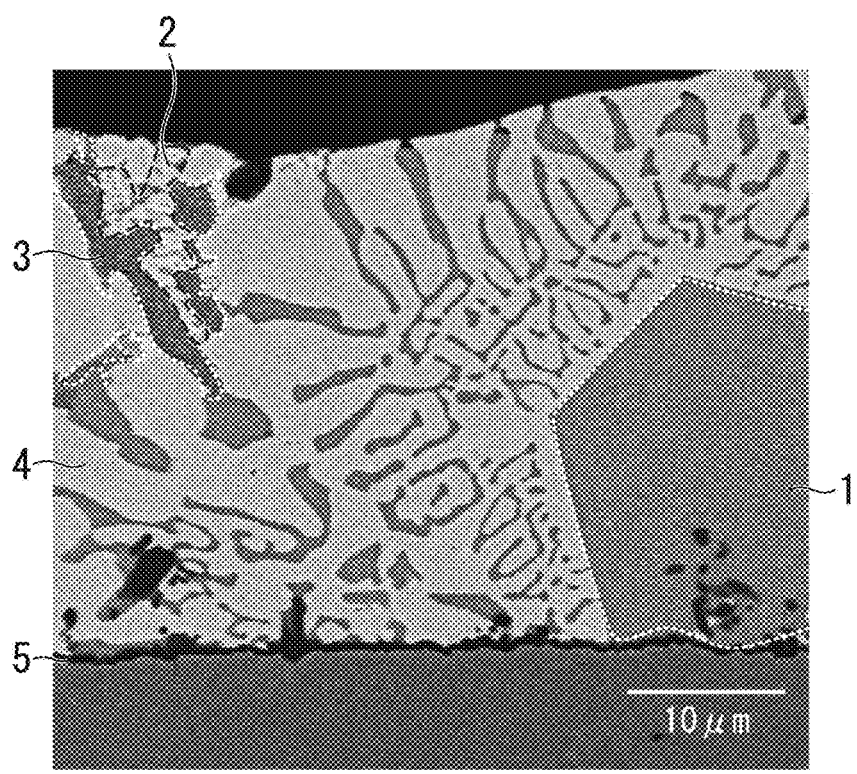

METALLIC COATED STEEL

TECHNICAL FIELD OF THE INVENTION

The present invention relates to a metallic coated steel.

The present application claims priority based on Japanese Patent Application No. 2022-025405 filed in Japan on Feb. 22, 2022, the contents of which are incorporated herein by reference.

RELATED ART

A metallic coated steel that has been subjected to hot dip galvanizing is widely used in automobiles, building materials, steel structures, home electric appliances, and the like because of having excellent anticorrosion performance and economic efficiency. Furthermore, in recent years, in order to further improve durability, hot-dip Zn—Al—Mg-based plating in which aluminum (Al) and magnesium (Mg) are added to Zn as described in, for example, Patent Documents 1 and 2 has been developed from a need for application of a hot-dip galvanizing steel to a severe corrosion environment. The hot-dip Zn—Al—Mg-based plating is applied to uses requiring high corrosion resistance.

In particular, since many steel structures require certain corrosion resistance, plating is applied to many steel structures. There are two ways to obtain a plated steel structure. One of the methods is a method in which a steel structure is formed by draw-forming, welding, or the like a steel sheet or the like, and then the steel structure is immersed in a plating bath. Hereinafter, this method is referred to as an immersion plating method. As the other method, there is a method for manufacturing a steel structure by draw-forming, welding, or the like a metallic coated steel sheet having a metallic coating layer formed on a surface in advance. Hereinafter, this method is referred to as a pre-plating method.

In the immersion plating method, in addition to occurrence of thermal strain after draw-forming and occurrence of poor external appearance during plating solidification, equipment is large-scale because a steel structure is immersed as it is in a plating bath, and cost may increase. Therefore, in many cases where manufacture of a steel structure can be automated, the latter pre-plating method is often adopted.

In addition, construction of a steel structure using a metallic coated steel involves welding work. Various welding methods such as arc welding, spot welding, and laser welding are applied to the welding in the steel structure. Among these, spot welding has attracted attention. This is because spot welding has characteristics that a solubilizing agent is unnecessary, the welding speed is high, slag fume is small, the influence of labor saving or skill of a worker is small, the thermal influence around a weld is small because welding can be performed at a pinpoint, and joining among different types of materials is also possible. Note that, when spot welding is performed, it is necessary to consider properties of a welding target material, an appropriate current value for each welding target material, selection of an electrode, and the like.

However, a metallic coating layer of a metallic coated steel may make spot welding difficult. This is because the metallic coating layer is easily melted during spot welding. In particular, in a case of a metallic coated steel including a metallic coating layer having a thickness exceeding 10 μm, electric conduction and thermal conduction are unstable, a current is not stabilized, and an appropriate welding nugget diameter cannot be obtained in some cases. That is, the width of a suitable welding current range decreases. In addition, when a welding electrode comes into contact with the metallic coating layer during welding, metals such as Zn and Al contained in the metallic coating layer may react with Cu which is a main component of the welding electrode, whereby the welding electrode may be worn to shorten an electrode life. These reasons make spot welding of the hot-dip metallic coated steel difficult.

Furthermore, the Zn—Al—Mg-based plating has a disadvantage that weldability is difficult because an electrode life property in spot welding is low and a suitable welding current range during welding is narrow. This has hindered uses frequently using welding, for example, an application of a Zn—Al—Mg-based metallic coated steel to a steel structure.

Therefore, for example, in an automobile field and the like, spot welding is used for a plated steel sheet having relatively small variations in properties and having a relatively small sheet thickness, such as an alloyed Zn-plated steel sheet or a hot-dip Zn-plated steel sheet, but it is difficult to set welding conditions when spot welding is performed on other plating materials. For this reason, for example, in a case where spot welding is performed on an alloy-based Zn—Al—Mg-based plated steel sheet as described in Patent Documents 1 and 2, the Zn—Al—Mg-based plated steel sheet has been used only for limited uses.

Examples of an application to uses requiring weldability include Patent Documents 3 and 4. However, in Patent Document 3, an electrode life property in spot welding is not sufficient, and in Patent Document 4, since manufacture is performed by vapor deposition due to an influence of composition, cost tends to be higher than that of hot-dip plating.

CITATION LIST

Patent Document

Patent Document 1: Japanese Unexamined Patent Application, First Publication No. H10-226865

Patent Document 2: Japanese Unexamined Patent Application, First Publication No. 2000-104154

Patent Document 3: Published Japanese Translation No. 2018-506644 of the PCT International Publication Patent Document 4: Published Japanese Translation No. 2020-504781 of the PCT International Publication

SUMMARY OF INVENTION

Problems to be Solved by the Invention

The present invention has been made in view of the above circumstances, and an object of the present invention is to provide a hot-dip coated steel which has an excellent electrode life property in spot welding, can widen a suitable welding current range during spot welding, and has excellent corrosion resistance around a weld.

Means for Solving the Problem

In order to solve the above problem, an aspect of the present invention adopts the following configurations.

[1] A metallic coated steel according to an aspect of the present invention is a metallic coated steel including a steel material and a metallic coating layer formed on a surface of the steel material, in which the metallic coating layer has an average chemical composition including, in terms of mass %,
  Al: 0.2% to less than 4.0%,
  Mg: more than 4.0% and less than 12.5%,
  Ca: 0.15% to less than 3.00%,
  Sn: 0% to less than 3.0%,
  Bi: 0% to less than 1.0%,
  In: 0% to less than 1.0%,
  Sc: 0% to less than 0.50%,
  Y: 0% to less than 0.50%,
  La: 0% to less than 0.50%,
  Ce: 0% to less than 0.50%,
  Sr: 0% to less than 0.50%,
  Si: 0% to less than 2.50%,
  B: 0% to less than 0.50%,
  P: 0% to less than 0.50%,
  Cr: 0% to less than 0.25%,
  Ti: 0% to less than 0.25%,
  Ni: 0% to less than 1.0%,
  Co: 0% to less than 0.25%,
  V: 0% to less than 0.25%,
  Nb: 0% to less than 0.25%,
  Cu: 0% to less than 1.0%,
  Mn: 0% to less than 0.25%,
  Mo: 0% to less than 0.25%,
  W: 0% to less than 0.25%
  Zr: 0% to less than 0.25%,
  Fe: 0% to less than 5.0%,
  Ag: 0% to less than 1.0%,
  Li: 0% to less than 0.50%,
  Na: 0% to less than 0.05%,
  K: 0% to less than 0.05%,
  Sb: 0% to less than 0.5%,
  Pb: 0% to less than 0.5%,
  Zn: 65% or more,
  and impurities, and
  in a cross section of the metallic coating layer in a thickness direction, a metallurgical structure observed in a scanning electron microscope observed visual field contains, in terms of area fraction,
    an $MgZn_2$ phase: 10 to 40%,
    an Al—Zn phase: 0 to 15%,
    an Al phase: 0 to 5%,
    a $CaZn_{13}$ phase: 1.0 to 15.0%, and
    the total of a [ternary eutectic structure of $Al/MgZn_2/Zn$] and a [binary eutectic structure of $MgZn_2/Zn$]: 30% or more.

[2] In the metallic coated steel according to [1], among the $CaZn_{13}$ phases of the metallurgical structure in the cross section of the metallic coating layer in the thickness direction, an average circle-equivalent diameter of top 80% $CaZn_{13}$ phases in descending order of circle-equivalent diameter may be 10 μm or more.

[3] In the metallic coated steel according to [1] or [2], when a mass concentration % of an element X in the average chemical composition of the metallic coating layer is represented by [X], the average chemical composition of the metallic coating layer may satisfy the following formula (1):

$$2.5\times[Al]+2\times[Ca]+[Y]+[Sr]+[La]+[Ce]>[Mg] \quad (1)$$

Effects of the Invention

According to the above aspect of the present invention, it is possible to provide a metallic coated steel which has an excellent electrode life property in spot welding, can widen a suitable welding current range during spot welding, and has excellent corrosion resistance.

BRIEF DESCRIPTION OF THE DRAWING

FIG. 1 is a reflected electron image of a metallurgical structure in a cross section of a metallic coating layer of Example 22.

EMBODIMENT OF THE INVENTION

As described above, the Zn—Al—Mg-based metallic coating layer is a Zn alloy-based metallic coating layer, and is generally a material that deteriorates spot weldability. On the other hand, the Zn—Al—Mg-based metallic coating layer has higher corrosion resistance than an ordinary Zn plating layer. Therefore, a metallic coated steel including the Zn—Al—Mg-based metallic coating layer is a promising metallic coated steel as a material of a steel structure if spot weldability of the metallic coating layer can be improved.

The present inventors have intensively conducted studies for improving weldability and corrosion resistance of a metallic coated steel. As a result, the present inventors have found that an Al phase existing in a block shape in a metallic coating layer is a factor that makes spot weldability unstable. The "Al phase" as used herein is an Al phase having a Zn concentration of less than 10%. When a large amount of the Al phase having a Zn concentration of less than 10% is generated, a suitable welding current range during welding is narrowed. Conversely, it has been found that by reducing the Al phase, the suitable welding current range is widened, and the metallic coating layer is easily welded.

Furthermore, the present inventors have found that an appropriate current value is further widened by appropriate inclusion of elements such as Mg and Ca in the metallic coating layer. In addition, the present inventors have found that by inclusion of Mg and Ca in appropriate amounts in the metallic coating layer, these elements form an oxide film such as a Ca—Mg-based oxide film on a surface of a Cu electrode during spot welding, and this oxide film inhibits a reaction between a Cu electrode and Al in the metallic coating layer, thereby improving the life of the electrode.

In addition, the metallic coated steel according to the present embodiment particularly has excellent corrosion resistance of a welded part. This is because an average grain size of $CaZn_{13}$ and $MgZn_2$ phases occupying a large volume fraction in the metallic coating layer increases, and an area fraction further increases, whereby it is difficult to react with the Cu electrode during welding, and thus the metallic coating layer itself is hardly melted. When the metallic coating layer itself is hardly melted, damage around a weld of the metallic coating layer is minimized, and the remaining amount of the metallic coating layer can be increased. As a result, corrosion resistance of the weld can be improved.

Hereinafter, the metallic coated steel according to the embodiment of the present invention will be described.

The metallic coated steel of the present embodiment includes: a steel material; and a metallic coating layer formed on a surface of the steel material, in which the metallic coating layer has an average chemical composition including, in terms of mass %, Al: 0.2% to less than 4.0%, Mg: more than 4.0% and less than 12.5%, Ca: 0.15% to less than 3.00%, Sn: 0% to 3.0%, Bi: 0% to less than 1.0%, In: 0% to less than 1.0%, Sc: 0% to less than 0.50%, Y: 0% to less than 0.50%, La: 0% to less than 0.50%, Ce: 0% to less than 0.50%, Sr: 0% to less than 0.50%, Si: 0% to less than 2.50%, B: 0% to less than 0.50%, P: 0% to less than 0.50%, Cr: 0% to less than 0.25%, Ti: 0% to less than 0.25%, Ni: 0% to less than 1.0%, Co: 0% to less than 0.25%, V: 0% to less than 0.25%, Nb: 0% to less than 0.25%, Cu: 0% to less than 1.0%, Mn: 0% to less than 0.25%, Mo: 0% to less than 0.25%, W: 0% to less than 0.25%, Zr: 0% to less than 0.25%, Fe: 0% to less than 5.0%, Ag: 0% to less than 1.0%, Li: 0% to less than 0.50%, Na: 0% to less than 0.05%, K: 0% to less than 0.05%, Sb: 0% to less than 0.5%, Pb: 0% to less than 0.5%, Zn: 65% or more, and impurities, and in a cross section of the metallic coating layer in a thickness direction, a metallurgical structure observed in a scanning electron microscope observed visual field contains, in terms of area fraction, an $MgZn_2$ phase: 10 to 40%, an Al—Zn phase: 0 to 15%, an Al phase (Zn<10%): 0 to 5%, a $CaZn_{13}$ phase: 1.0 to 15.0%, and the total of a [ternary eutectic structure of Al/$MgZn_2$/Zn] and a [binary eutectic structure of $MgZn_2$/Zn]: 30.0% or more.

In addition, among the $CaZn_{13}$ phases of the metallurgical structure in the cross section of the metallic coating layer in the thickness direction, an average circle-equivalent diameter of top 80% $CaZn_{13}$ phases having larger circle equivalent diameters is preferably 10 μm or more.

Furthermore, when a mass concentration % of an element X in the average chemical composition of the metallic coating layer is represented by [X], the average chemical composition of the metallic coating layer preferably satisfies the following formula (1):

$$2.5\times[Al]+2\times[Ca]+[Y]+[Sr]+[La]+[Ce]>[Mg] \tag{1}$$

In the following description, the expression "%" of the amount of each element in a chemical composition means "mass %". In addition, a numerical range represented by "to" means a range including numerical values described before and after "to" as the lower limit and the upper limit. Note that a numerical range in which "more than" or "less than" is attached to the numerical values described before and after "to" means a range not including these numerical values as the lower limit or the upper limit.

"Corrosion resistance" indicates a property that a metallic coating layer itself is hardly corroded. The Zn-based metallic coating layer has a sacrificial corrosion protection on the steel material. Therefore, in a corrosion process of the metallic coated steel, the metallic coating layer is corroded and turns into white rust before the steel material is corroded, the metallic coating layer that has turned into white rust disappears, and then the steel material is corroded to generate red rust.

"Suitable welding current range" is a welding term, and is, for example, the difference between a current value in a case where the diameter of a nugget formed at a center portion of two overlapping sheets of the steel material that has been subjected to spot welding is 4×√t and a current value until generation of expulsion, in which t (mm) represents the thickness of the metallic coated steel. As the suitable welding current range is larger, the material is evaluated to be more easily welded, and as the suitable welding current range is narrower, the material is evaluated to be more hardly welded because a nugget having an appropriate size is not formed. The suitable welding current range is determined from a so-called weld lobe curve.

"Electrode life property in spot welding" is one of indices of weldability evaluated by the number of spotting points that does not fall below a predetermined nugget diameter under certain welding conditions. Specifically, when welding is continuously performed with a median value of the suitable welding current range as a welding current without replacing an electrode, as the number of times of welding until a predetermined nugget diameter cannot be obtained is larger, a metallic coated steel is evaluated to have a better electrode life property in spot welding. A metallic coated steel having an excellent electrode life property in spot welding is advantageous in terms of manufacturing cost.

The shape of the steel material is not particularly limited. Examples of the steel material include, in addition to a steel sheet, a steel pipe, a civil engineering and construction material (a fence culvert, a corrugated pipe, a drain channel lid, a splash preventing plate, a bolt, a wire mesh, a guard rail, a water stop wall, or the like), a roof material, a home electric appliance member (a housing of an outdoor unit of an air conditioner or the like), an automobile external plate, and a part (a suspension member or the like).

A material of the steel material is not particularly limited. For example, various steel materials such as a general steel, an Al-killed steel, an ultra-low carbon steel, a high carbon steel, various high tensile strength steels, and some high alloy steels (a steel containing a reinforcing element such as Ni or Cr) are applicable to the steel material. In addition, the steel material is not particularly limited in terms of conditions such as a method for manufacturing the steel material and a method for manufacturing a steel sheet (a hot rolling method, a pickling method, a cold rolling method, or the like). Furthermore, as the steel material, a steel material on which a metal film or an alloy film made of Zn, Ni, Sn, an alloy thereof, or the like and having a thickness of less than 1 μm is formed may be used.

Next, the metallic coating layer will be described.

The metallic coating layer according to the present embodiment includes a Zn—Al—Mg-based alloy layer. The metallic coating layer may include an Al—Fe alloy layer. The Zn—Al—Mg-based alloy layer has corrosion resistance equivalent to or higher than that of a Zn plating layer. Therefore, the metallic coating layer of the present embodiment also has corrosion resistance equivalent to or higher than that of the Zn plating layer.

The Al—Fe alloy layer is an interfacial alloy layer between the steel material and the Zn—Al—Mg alloy layer. That is, the metallic coating layer according to the present embodiment may have a single-layer structure of the Zn—Al—Mg alloy layer or a multi-layer structure including the Zn—Al—Mg alloy layer and the Al—Fe alloy layer. On an outermost surface of the metallic coating layer, an oxide film of an element constituting the metallic coating layer is formed with a thickness of about less than 1 μm. However, this oxide film is thin with respect to the thickness of the entire metallic coating layer, and thus is often ignored from the main constituent of the metallic coating layer.

The thickness of the entire metallic coating layer is preferably set to be 5 to 80 μm. In general, the thickness of the metallic coating layer is an item that affects weldability in spot welding, and a metallic coating layer of 20 μm or more is usually unsuitable for welding. However, the metallic coated steel of the present embodiment can widen a suitable welding current range during spot welding, and thus can be welded even when the thickness of the metallic coating layer is 80 μm at a maximum. Therefore, the thickness of the metallic coating layer is preferably set to be 80 μm or less. When the thickness of the metallic coating layer is less than 5 μm, corrosion resistance is reduced, and therefore the thickness of the metallic coating layer is preferably 5 μm or more.

When the metallic coating layer includes the Al—Fe alloy layer, the thickness of the Al—Fe alloy layer is about several 10 nm to 5 μm, which is less than about 1/10 of the thickness of the upper Zn—Al—Mg alloy layer. The Al—Fe alloy layer bonds the steel material and the Zn—Al—Mg-based alloy layer to improve peeling resistance of the metallic coating layer. The thickness of the interfacial alloy layer can be controlled by various conditions such as a plating bath temperature and a plating bath immersion time during manufacture of the metallic coated steel. Usually, since the interfacial alloy layer has a melting point higher than that of the upper Zn—Al—Mg-based alloy layer, the interfacial alloy layer has a small influence on the entire weldability, and there is no problem in forming the Al—Fe alloy layer having such a thickness.

Since the thickness of the entire metallic coating layer depends on plating conditions, the thickness of the entire metallic coating layer is not necessarily limited to the range of 5 to 80 μm. The thickness of the entire metallic coating layer is affected by the viscosity and specific gravity of a plating bath in a normal hot-dip plating method. In addition, the thickness of the entire metallic coating layer is adjusted by a drawing speed of the steel material (original sheet to be coated) and the strength of wiping.

The Al—Fe alloy layer is formed on a surface of the steel material (specifically, between the steel material and the Zn—Al—Mg alloy layer), and is a layer having an $Al_5Fe_2$ phase as a main phase in the microstructure. The Al—Fe alloy layer is formed by mutual atomic diffusion between a base metal (steel material) and a plating bath. When a hot-dip plating method is used as a manufacturing method, the Al—Fe alloy layer is easily formed in a metallic coating layer containing an Al element. Since a certain concentration or more of Al is contained in the plating bath, the $Al_5Fe_2$ phase is formed most. However, the atomic diffusion takes time, and there is a portion where an Fe concentration is high in a portion close to the base metal. Therefore, a small amount of an AlFe phase, an $Al_3Fe$ phase, an $Al_5Fe$ phase, or the like may be partially contained in the Al—Fe alloy layer. In addition, since a certain concentration of Zn is also contained in the plating bath, a small amount of Zn is also contained in the Al—Fe alloy layer.

When Si is contained in the metallic coating layer, Si is particularly easily incorporated into the Al—Fe alloy layer, and an Al—Fe—Si intermetallic compound phase may be formed. Examples of the intermetallic compound phase to be identified include an AlFeSi phase, and there are an α-AlFeSi phase, a β-AlFeSi phase, a q1-AlFeSi phase, a q2-AlFeSi phase, and the like exist as isomers. Therefore, these AlFeSi phases and the like may be detected as the Al—Fe alloy layer. The Al—Fe alloy layer containing these AlFeSi phases and the like is also referred to as an Al—Fe—Si alloy layer.

Next, the average chemical composition of the entire metallic coating layer will be described.

Note that, when the metallic coating layer has a single-layer structure of the Zn—Al—Mg alloy layer, the "average chemical composition of the entire metallic coating layer" is an average chemical composition of the Zn—Al—Mg alloy layer. When the metallic coating layer has a multi-layer structure of the Al—Fe alloy layer and the Zn—Al—Mg alloy layer, the "average chemical composition of the entire metallic coating layer" is an average chemical composition of the total of the Al—Fe alloy layer and the Zn—Al—Mg alloy layer.

In the hot-dip plating method, the chemical composition of the Zn—Al—Mg alloy layer is usually almost the same as that of a plating bath because a metallic coating layer forming reaction is almost completed in the plating bath. In the hot-dip plating method, the Al—Fe alloy layer is instantaneously formed and grown immediately after immersion in the plating bath. In addition, an Al—Fe alloy layer forming reaction is completed in the plating bath, and the thickness of the Al—Fe alloy layer is often sufficiently smaller than that of the Zn—Al—Mg alloy layer. Therefore, unless a special heat treatment such as a heat alloying treatment is performed after plating, the average chemical composition of the entire metallic coating layer is substantially equal to the chemical composition of the Zn—Al—Mg alloy layer, and the components of the Al—Fe alloy layer and the like can be ignored.

Hereinafter, elements contained in the metallic coating layer will be described.

Zn: 65% or More

Zn is a metal having a low melting point, and exists as a main phase of the metallic coating layer on the steel material. A reason why weldability of the metallic coated steel is deteriorated as compared with a steel material having no metallic coating layer is that Zn reacts with an electrode and changes an energization state between the electrode and the metallic coating layer. Usually, a copper electrode is often used as an electrode for spot welding, but when Zn and copper (Cu) are exposed to high heat, a reaction occurs. This reactivity is smaller than that in a case of Cu and Al. This is presumed to be related to formation of Al—Cu in an eutectic composition. On the other hand, Zn is an element necessary for ensuring corrosion resistance and obtaining a sacrificial corrosion protection on the steel material. When the Zn content is less than 65%, the sacrificial corrosion resistance is insufficient. Therefore, the Zn content is set to be 65% or more. The Zn content is more preferably set to be 70% or more. Note that the upper limit of the Zn content is the amount of the remainder other than elements excluding Zn and impurities.

Al: 0.2% to Less than 4.0%

Similarly to Zn, Al is an element mainly constituting the metallic coating layer. Although Al has a small sacrificial corrosion protection, inclusion of Al in the metallic coating layer improves flat portion corrosion resistance and corrosion resistance of a welded part. In addition, when Al does not exist in the metallic coating layer, Mg cannot be stably held in the plating bath. Therefore, Al is added to the plating bath as an essential element in manufacture.

Al contained in the metallic coating layer reacts with a copper electrode during spot welding. A reaction product is an Al—Cu-based intermetallic compound, which deteriorates conductivity and deteriorates an electrode life. In the present embodiment, as a means for minimizing an influence of Al, a relatively large amount of Zn is solid-dissolved in an Al phase in the metallurgical structure of the metallic coating layer to form an Al—Zn phase, and the grain size of the $CaZn_{13}$ phase is increased to reduce reactivity with the copper electrode. Details will be described later.

A reason why the amount of Al is set to be 0.2% or more is that this content is required for containing a large amount of Mg described later, and it is difficult to form a plating bath when the amount of Al is equal to or less than this content. That is, when a bath containing Mg is held in a molten state, Mg reacts with oxygen in air to form a large amount of MgO-based oxide, which makes it difficult to use the bath as a plating bath. Al has an effect of forming a dense $Al_2O_3$ coating on a bath surface and suppressing oxidation of Mg. Therefore, it is desirable to add Al to a plating bath containing Mg. Al is also an element that contributes to improvement of corrosion resistance of a welded part. When the Al content in the metallic coating layer is excessively small, corrosion resistance of the weld may be deteriorated. Therefore, the Al content is set to be 0.2% or more.

A reason why the amount of Al is set to be less than 4.0% is that a large amount of Al phase is likely to be precipitated in the metallic coating layer when the amount of Al is equal to or more than this content. When a large amount of Al phase is precipitated, spot weldability and an electrode life property in spot welding are reduced, or electrical conductivity and thermal conductivity are increased. Furthermore, when the Al content is excessively large, $Al_2O_3$ is likely to be formed on a surface of the metallic coating layer, reactivity with an electrode is active during spot welding, a current value is unstable, and a suitable welding current range is narrowed. In addition, when the Al content is excessively large, an Al—Ca—Si intermetallic compound layer is preferentially formed, and a desired amount of Ca—Zn-based alloy phase, particularly $CaZn_{13}$ phase cannot be ensured in some cases. As will be described in detail later, by forming a predetermined amount of $CaZn_{13}$ phase, expansion of the suitable welding current range and an increase in the number of continuous spotting points can be achieved. Therefore, the upper limit of the Al content is set to be less than 4.0% in consideration of the reaction with the electrode during spot welding and ensuring of the precipitation amount of the $CaZn_{13}$ phase. The Al content is more preferably more than 1.5% and 3.5% or less, and may be more than 2.0% and 3.0% or less.

Similarly to Al, elements that suppress Mg oxidation are Ca, Y, La, Ce, and Sr. Therefore, when [X] represents a mass concentration (%) of each element X, oxidation of Mg can be suppressed in the plating bath by satisfying the following formula (1). As a result, the average chemical composition of the metallic coating layer does not deviate from the target composition, and a large amount of $MgZn_2$ phase can be formed in the metallic coating layer, corrosion resistance of the metallic coating layer can be improved, and the suitable welding current range during spot welding can be widened.

$$2.5\times[Al]+2\times[Ca]+[Y]+[Sr]+[La]+[Ce]>[Mg] \quad (1)$$

Mg: More than 4.0% and Less than 12.5%

Mg is an element that has a sacrificial corrosion protection and enhances corrosion resistance of the metallic coating layer. When a certain amount or more of Mg is contained in the metallic coating layer, an $MgZn_2$ phase is formed in the metallic coating layer. As the Mg content in the metallic coating layer is higher, more $MgZn_2$ phase is formed, and corrosion resistance is improved. In addition, the melting point of the $MgZn_2$ phase is higher than the that of the Zn phase, and when a large amount of $MgZn_2$ phase is contained in the metallic coating layer, reactivity between Zn and an electrode is poor. That is, since the melting point of Zn bonded to Mg rises, reactivity with the electrode decreases, and a life of the electrode can be prolonged. In addition, since Mg is easily oxidized, Mg slightly melted during spot welding is immediately oxidized to form MgO oxide having a constant thickness. Such a tendency of Mg oxidation is larger than that of Al and Zn. Therefore, when spot welding is performed for several spotting points on a metallic coating layer containing an appropriate amount of Mg, a surface of the electrode is covered with a thin Mg oxide film, a state between the surface of a metallic coating layer and the electrode is stabilized all the times, and a current value is stabilized. In addition, this Mg oxide film serves as a barrier against reactive welding/reaction between the electrode and the metallic coating layer, and can significantly prolong the life of the copper electrode.

A reason why the amount of Mg is set to be more than 4.0% is to sufficiently ensure corrosion resistance. In addition, when the Mg content is 4.0% or less, reactivity between Zn and the copper electrode is active, and the appropriate current value is narrowed. On the other hand, when the Mg content is excessive, it is difficult to manufacture the metallic coated steel, and powdering of the metallic coating layer occurs during processing. Therefore, the upper limit of the Mg content is less than 12.5%. The Mg content is more preferably more than 5.0% and 10.0% or less, and may be more than 5.0% and 8.0% or less.

Ca: 0.15% to Less than 3.00%

Ca is an element that contributes most to spot weldability. Ca is the most easily oxidized element in the atmosphere, and similarly to Mg, a small amount of Ca melted in the metallic coating layer immediately forms an oxide film, covers a surface of the copper electrode, and acts as a barrier to a reaction between the electrode and the Zn phase and a reaction between the electrode and the Al phase. That is, by inclusion of Ca in the metallic coating layer, the suitable welding current range is widened, and the number of continuous spotting points tends to be increased. In addition, as described above, Ca has an effect of suppressing Mg oxidation in the plating bath and enhancing stability of the plating bath.

In addition, when Ca is contained in the metallic coating layer, a Zn—Ca-based compound or an Al—Ca—Si-based compound is formed. These compounds are formed as a primary phase during solidification of the metallic coating layer, serve as a starting point of growth of the $MgZn_2$ phase, and promote formation of a coarse $MgZn_2$ phase.

A reason why the amount of Ca is set to be 0.15% or more is that this content is required for ensuring an appropriate current value and a continuous spotting point, and when the Ca concentration is less than 0.15%, reactivity between Zn and the copper electrode is active, the appropriate current value is narrowed, and the number of continuous spotting points also decreases. When the Ca content is too small, the formation amount of the Zn—Ca-based compound, particularly the $CaZn_{13}$ phase may be insufficient. On the other hand, when the Ca content exceeds the upper limit, it tends to be difficult to form a plating bath. In addition, when the Ca content is too large, adhesion of dross or the like increases, weldability tends to deteriorate, the appropriate current value is narrowed, and the number of continuous spotting points may decrease. Therefore, the Ca content is set to be 0.15% or more and less than 3.00%, preferably set to be 0.20% or more and less than 2.00%, and more preferably set to be 0.20% or more and less than 1.50%.

Element group A

Sn: 0% to less than 3.0%,
　　Bi: 0% to less than 1.0%,
　　In: 0% to less than 1.0%

The metallic coating layer may contain any one or more types of elements belonging to the element group A. An effect of Sn, Bi, and In belonging to the element group A during spot welding is not large. On the other hand, these elements have a function of improving a sacrificial corrosion protection. Note that, since these elements tend to be bonded to Mg stronger than Zn and the effect of Mg contained is reduced, there is the upper limit to the amount of each of these elements. When the amounts of each of Sn, Bi, and In exceeds the upper limit, adhesion of dross or the like increases, weldability tends to deteriorate, the appropriate current value is narrowed, and the number of continuous spotting points may decrease. Therefore, the amount of Sn is set to be 0 to less than 3.0%, and more preferably set to be more than 0% and less than 3.0%. The amount of Bi is set to be 0% to less than 1.0%, and more preferably set to be more than 0% and less than 1.0%. The amount of In is set to be 0% to less than 1.00%, and more preferably set to be more than 0% and less than 1.00%. The amount of Sn is set to be 0% to less than 3.0%, and more preferably set to be more than 0% and less than 3.0%. The amount of Bi is set to be 0% to less than 1.0%, and more preferably set to be more than 0% and less than 1.0%. The amount of In is set to be 0% to less than 1.0%, and more preferably set to be more than 0% and less than 1.0%.

Element Group B
- Sc: 0% to less than 0.50%,
- Y: 0% to less than 0.50%,
- La: 0% to less than 0.50%,
- Ce: 0% to less than 0.50%,
- Sr: 0% to less than 0.50%

The metallic coating layer may contain any one or more types of elements belonging to the element group B. Sc, Y, La, Ce, and Sr belonging to the element group B are elements that contribute to performance of spot welding. Similarly to Ca, Sc, Y, La, Ce, and Sr are also oxidized in the atmosphere, and have an effect of serving as a reaction barrier between the Cu electrode and the Zn phase or the Al phase. In addition, Ca has an effect of suppressing Mg oxidation in the plating bath and enhancing stability of the plating bath. In order to suitably exhibit such an effect, the amount of each of these elements is set to be more than 0%, and more preferably set to be 0.01% or more. Note that the amount of each of the elements has an upper limit. The amount of each of Sc, Y, La, Ce, and Sr is set to be 0% to less than 0.50%, preferably set to be more than 0% and less than 0.50%, and more preferably set to be 0.01% or more and less than 0.50%.

Element Group C
- Si: 0% to less than 2.50%,
- B: 0% to less than 0.50%,
- P: 0% to less than 0.50%

The metallic coating layer may contain any one or more types of elements belonging to the element group C. Si, B, and P belonging to the element group C are elements belonging to a semimetal. These elements also generally form an intermetallic compound containing Zn and Al in the metallic coating layer, and as a result, the metallic coating layer is less likely to be melted, and reactivity of the metallic coating layer with the electrode is lowered. That is, inclusion of the element group C in the metallic coating layer tends to widen the suitable welding current range. Note that the element group C has no effect of forming a coating on a surface of the electrode, unlike Mg and Ca. There is an upper limit to the amount of each of the elements, and when the content exceeds the upper limit, adhesion of dross or the like tends to increase, and weldability tends to deteriorate. Therefore, the amount of Si is set to be 0% to less than 2.50%, preferably set to be more than 0% and less than 1.00%, and the amount of each of B and P is set to be 0% to less than 0.50%, preferably set to be more than 0% and less than 0.50%.

Element group D
- Cr: 0% to less than 0.25%,
- Ti: 0% to less than 0.25%,
- Ni: 0% to less than 1.0%,
- Co: 0% to less than 0.25%,
- V: 0% to less than 0.25%,
- Nb: 0% to less than 0.25%,
- Cu: 0% to less than 1.0%,
- Mn: 0% to less than 0.25%,
- Mo: 0% to less than 0.25%,
- W: 0% to less than 0.25%,
- Zr: 0% to less than 0.25%,
- Fe: 0% to less than 5.0%,
- Ag: 0% to less than 1.0%

The metallic coating layer may contain any one or more types of elements belonging to the element group D. Cr, Ti, Ni, Co, V, Nb, Cu, Mn, Mo, W, Zr, Ag, and Fe belonging to the element group D are metal elements. These elements are incorporated into the metallic coating layer to form a substitutional solid solution or a new intermetallic compound having a high melting point. As a result, the metallic coating layer is less likely to be melted, and reactivity of the metallic coating layer with the copper electrode is lowered. That is, the suitable welding current range tends to be widened by inclusion of the element group D in the metallic coating layer. Note that the element group D has no effect of forming a coating on a surface of the electrode, unlike Mg and Ca, and has a small effect of improving spot weldability as compared with Mg and Ca. In particular, when at least one or more elements belonging to the element group B exist, a clear effect by the element group D cannot be confirmed in some cases. On the other hand, when the element group B, the element group C, and the element group D are used in combination, the suitable welding current range during spot welding is further widened. There is an upper limit to the amount of each of the elements belonging to the element group D, and when the content exceeds the upper limit, adhesion of dross or the like tends to increase, and weldability tends to deteriorate. Therefore, the amount of each of Cr, Ti, Co, V, Nb, Mn, Mo, W, and Zr is set to be 0% to less than 0.25%, and preferably set to be more than 0% and less than 0.25%. The amount of each of Ni and Cu is set to be 0% to less than 1.0%, and preferably set to be more than 0% and less than 1.0%. The amount of Ag is set to be 0% to less than 1.0%. In addition, Fe may be inevitably contained in the metallic coating layer. This is because Fe may be diffused from the base metal into the metallic coating layer during manufacture of plating. Therefore, the amount of Fe is 0% to less than 5.00%, and may be more than 0% and less than 5.0%.

Element Group E
- Sb: 0% to less than 0.5%,
- Pb: 0% to less than 0.5%

Sb and Pb belonging to the element group E are elements having properties similar to those of Zn. Therefore, when these elements are contained, a special effect is hardly exhibited in spot weldability, but there is an effect that a spangle pattern is easily formed on an external appearance of plating, or the like. Note that when Sb and Pb are excessively contained, corrosion resistance after spot welding may be reduced. Therefore, the amount of each of Sb and Pb is set to be 0% to less than 0.5%.

Element Group F
- Li: 0% to less than 0.5%,
- Na: 0% to less than 0.05%,
- K: 0% to less than 0.05%

Li, Na, and K belonging to the element group F are elements belonging to an alkali metal. These elements have a property of being very easily oxidized, but rarely exhibit a special effect in spot welding. Note that when a large amount of these elements is contained, the elements are oxidized on a surface of the plating bath to form a dross, and therefore it is difficult to form a bath. Therefore, the amount of Li is set to be 0% to less than 0.5%, and the amount of each of Na and K is set to be 0% to less than 0.05%.

Remainder: 65% or More of Zn and Impurities

Of the remainder, Zn is as described above. The impurity in the metallic coating layer refers to a component that is contained in a raw material or mixed in a manufacturing process and is not intentionally contained. For example, in the metallic coating layer, a small amount of component other than Fe may be mixed as the impurity due to mutual atomic diffusion between the steel material (base metal) and the plating bath.

The average chemical composition of the metallic coating layer can be identified by the following method.

First, an acid solution is obtained by peeling and dissolving the metallic coating layer with an acid containing an inhibitor that suppresses corrosion of the base metal (steel material). Next, the obtained acid solution is measured by ICP emission spectrometry or ICP-MS. As a result, the average chemical composition of the metallic coating layer can be obtained. The type of the acid is not particularly limited as long as the acid can dissolve the metallic coating layer. If the area and weight before and after peeling are measured, a plating adhesion amount (g/m$^2$) can also be obtained at the same time.

Next, a microstructural morphology of the metallic coating layer will be described.

The ratio and size of a phase contained in the metallic coating layer largely affect spot weldability of the metallic coating layer. Even in a case of metallic coating layers having the same composition, a phase or a microstructure contained in a metallurgical structure of each of the metallic coating layers changes depending on a manufacturing method, and the properties of the metallic coating layers are different from each other. The metallurgical structure of the metallic coating layer can be easily confirmed by a scanning electron microscope (SEM-EDS) with an energy dispersive X-ray analyzer. Specifically, a state of an approximate metallurgical structure of the metallic coating layer can be confirmed by, for example, obtaining a reflected electron image in a mirror-finished cross section of the metallic coating layer. The "cross section of the metallic coating layer" as used herein means a cross section in a thickness direction of the metallic coating layer and perpendicular to a surface of the metallic coating layer.

Since the thickness of the metallic coating layer of the present embodiment is about 5 to 80 µm, it is preferable to confirm a metallurgical structure thereof in a visual field at a magnification of 500 to 5,000 times in SEM. For example, when the cross section of the metallic coating layer having a thickness of 25 µm is confirmed at a magnification of 2,000 times, the cross section of the metallic coating layer in a region of 25 µm (plating thickness)×40 µm (SEM field width)=1,000 µm$^2$ can be confirmed per visual field. In the case of the present embodiment, in visual field setting of SEM for the metallic coating layer, there is a possibility that a local visual field is observed. Therefore, in order to obtain average information regarding a microstructural morphology of the metallic coating layer, it is only required to select 25 visual fields from any cross section and to use the selected visual fields as the average information. That is, it is only required to determine an area fraction and size of a phase or a microstructure constituting the metallurgical structure of the metallic coating layer by observing the metallurgical structure in a visual field of 25,000 µm$^2$ in total.

The reflected electron image by SEM is preferable in that a phase or a microstructure included in the metallic coating layer can be easily distinguished. An element having a small atomic number, such as Al is imaged in black, and an element having a large atomic number, such as Zn is imaged in white. Therefore, the ratio of each of these microstructures can be easily read.

In order to confirm each phase in the metallic coating layer, it is only required to confirm the composition of the phase at pinpoint in EDS analysis, and to read a phase having substantially equivalent components from element mapping or the like to specify the phase. When EDS analysis can be used, a phase having almost the same composition can be distinguished by obtaining an element mapping image. If a phase having almost the same composition can be specified, the area of a crystal phase in an observed visual field can be found. If the area is grasped, an equivalent circle diameter can be obtained by calculation, and an average grain size can be calculated.

As a method for obtaining the "equivalent circle diameter", the following method is adopted. First, binarized image processing is performed on an EDS element mapping image using commercially available image processing software to extract only a phase for which the equivalent circle diameter is desired to be obtained. After noise is removed, the area of each crystal phase is measured. The equivalent circle diameter can be obtained by calculating a circle having an area equal to the measured area. The average grain size can be derived from the equivalent circle diameter of each crystal phase by arithmetical mean.

In addition, a phase ratio in the metallic coating layer can be obtained from an area of each phase in an observed visual field. Note that, in the present embodiment, the area fraction of a specific phase in the metallic coating layer is regarded as a volume percentage of the phase in the metallic coating layer.

For the area of each phase, the following method is adopted. First, a phase having the same composition is extracted from an EDS element mapping image by binarization image processing using commercially available image processing software. After noise is removed, the area of the extracted phase is measured, whereby the area of the phase having the same composition can be obtained. Note that the interfacial alloy layer of the present embodiment is formed at a boundary between the metallic coating layer and the steel material and is an Al—Fe-based layer. Therefore, in the EDS element mapping image, the interfacial alloy layer can be extracted as a region where Al and Fe overlap with each other on the steel material. In specifying the interface alloy phase, a reflected electron image by SEM may be used as an aid. In this case, since Al is a light element, the interfacial alloy layer can be confirmed as a dark region on the steel material.

Hereinafter, a phase and a microstructure included in the metallic coating layer will be described.

FIG. 1 is an example of a reflected electron image by SEM of a metallurgical structure in a cross section of a metallic coating layer of Example 22. In FIG. 1, reference number 1 represents an MgZn$_2$ phase, reference number 2 represents a CaZn$_{13}$ phase, reference number 3 represents an Al—Zn phase, reference number 4 represents a eutectic structure, and reference number 5 represents an interfacial alloy layer.

When a metallurgical structure of the metallic coating layer of the present embodiment is observed in a visual field of 25000 µm$^2$ in total by SEM, the metallic coating layer includes 10 to 40 area % of an MgZn$_2$ phase, 0 to 15 area % of an Al—Zn phase having a Zn content of 10% or more, 0 to 5 area % of an Al phase having a Zn content of less than 10%, 1 to 15 area % of a CaZn$_{13}$ phase, and 30 area % or more of a eutectic structure (a total of a [ternary eutectic structure of Al/MgZn$_2$/Zn] and a [binary eutectic structure of MgZn$_2$/Zn]). The above phases and microstructures are preferably 90% or more in area fraction of the metallic coating layer.

MgZn$_2$ Phase

The MgZn$_2$ phase according to the present embodiment is a region in which an Mg concentration is 16% (+5%) and a Zn concentration is 84 (+5%) in the metallic coating layer. The MgZn$_2$ phase is often photographed in gray having an intermediate color between the colors of Al and Zn in a SEM reflected electron image. In the SEM reflected electron image, the MgZn$_2$ phase can be clearly distinguished from an Al—Zn phase, an Al phase, a [ternary eutectic structure of Al/MgZn$_2$/Zn], a [binary eutectic structure of MgZn$_2$/Zn], and the like.

In the composition of the metallic coating layer in the present embodiment, a large amount of MgZn$_2$ phase in a block shape is generated. The existence of the large amount of MgZn$_2$ phase in the metallic coating layer tends to increase a suitable welding current range during spot welding. In addition, the existence of the large amount of the MgZn$_2$ phase in the metallic coating layer makes it possible to relatively reduce the ratio of a Zn phase contained in the [ternary eutectic structure of Al/MgZn$_2$/Zn] and the [binary eutectic structure of MgZn$_2$/Zn], and to reduce reactivity between the metallic coating layer and an electrode of a spot-welding machine. In addition, during spot welding, a small amount of MgZn$_2$ phase is melted, and Mg is oxidized in the atmosphere to form an Mg-based oxide film on a surface of the copper electrode. This Mg-based oxide film is often formed within the first 10 spotting points of the electrode, and due to the existence of this Mg-based oxide film, a subsequent appropriate current value is also stabilized, and the reaction of the electrode hardly proceeds.

The area fraction of the MgZn$_2$ phase in the metallic coating layer is 10% or more. As the Mg content in the metallic coating layer increases, the volume percentage of the MgZn$_2$ phase increases to improve spot weldability. The area fraction is preferably 15% or more, more preferably 20% or more, and still more preferably 30% or more. The upper limit of the area fraction of the MgZn$_2$ phase is set to be 40% or less. It is difficult to set the area fraction of the MgZn$_2$ phase to more than 40% within the range of the average chemical composition of the metallic coating layer as a target of the present embodiment. Note that, in the present embodiment, MgZn$_2$ contained in the [ternary eutectic structure of Al/MgZn$_2$/Zn] and the [binary eutectic structure of MgZn$_2$/Zn] is not included in the area fraction of the MgZn$_2$ phase.

When a grain size of the MgZn$_2$ phase in the metallic coating layer is largely increased to increase the area fraction of the MgZn$_2$ phase, the metallic coating layer is hardly melted by heat input in spot welding and hardly reacts with the electrode. That is, the electrode life property in spot welding can be further improved. In addition, since a phase having excellent corrosion resistance remains even after spot welding, corrosion resistance is also improved. In order to grow the MgZn$_2$ phase to increase the area fraction of the MgZn$_2$ phase, one or more elements selected from Ca and the element group B are preferably contained.

Al Phase

The Al phase in the present embodiment is a region where an Al concentration is 90 mass % or more in the metallic coating layer. This Al phase may contain Zn, but a Zn concentration in the Al phase in this case is less than 10%. This difference in Zn concentration distinguishes the Al phase from the Al—Zn phase. The Al phase can be clearly distinguished from other phases and microstructures in a SEM reflected electron image. That is, the Al phase is often indicated in the blackest color in the SEM reflected electron image. In the present embodiment, the Al phase takes various forms, for example, the Al phase appears as a block-shaped cross section or a dendritic cross section such as a circular cross section or a flat cross section in any cross section. When the area fraction of the Al phase is calculated, the target Al phase is an Al phase having a grain size of 1 μm or more. That is, in the present embodiment, an Al phase having a grain size of 1 μm or more is counted as an "Al phase", and an Al phase having a grain size of less than 1 μm is not included in the area fraction of the Al phase.

The Al phase reduces spot weldability. When the Al phase appears on a surface of the metallic coating layer, an insulating coating of a thin film of Al$_2$O$_3$ or the like is formed to reduce the suitable welding current range, and the Al phase also reacts with the copper electrode to form an Al—Cu-based intermetallic compound between the Al phase and the electrode, thereby significantly reducing an electrode life and lowering the electrode life property in spot welding. When the area fraction of the Al phase is 5% or less, the electrode life tends to be prolonged in spot welding. Therefore, the Al phase is set to be 5 area % or less, and preferably set to be 0 area %.

Al—Zn Phase

The Al—Zn phase in the present embodiment is a phase containing 10 mass % or more of Zn and Al. The Al—Zn phase is an aggregate of a fine Zn phase (hereinafter, referred to as a fine Zn phase) having a grain size of about 1 μm and a fine Al phase (hereinafter, referred to as a fine Al phase) having a grain size of less than 1 μm. In the metallic coating layer in a molten state, Al has a structure different from a crystal structure at room temperature, a large amount of the Zn phase can be solid-solved in Al, and Al exists as a high-temperature stable phase containing about 50% of Zn. On the other hand, at room temperature, the solid solution amount of Zn extremely decreases in this high-temperature stable phase, Al and Zn are equilibrium-separated, and Al exists as an Al—Zn phase containing the fine Al phase and the fine Zn phase. That is, the Al—Zn phase is a phase containing 10 to 80 mass % of the fine Zn phase. This Al—Zn phase has different properties from the Al phase and the Zn phase contained in the metallic coating layer, and therefore is distinguished in a reflected electron SEM image and wide-angle X-ray diffraction. The Al—Zn phase is said to have a unique diffraction peak as, for example, Al$_{0.403}$Zn$_{0.597}$ (JCPDS card #00-052-0856, JCPDS: Joint Committee on Powder Diffraction Standards) or Al$_{0.71}$Zn$_{0.29}$ (PDF card #00-019-0057, PDF: Powder Diffraction File) in wide-angle X-ray diffraction. Therefore, in the present embodiment, a phase having an Al concentration of 90 to 20 mass % and a Zn concentration of 10 to 80 mass % is defined as the Al—Zn phase. The crystal size of the Al—Zn phase can also be defined by surrounding a region of the Al—Zn phase in a closed space.

The Al phase has extremely high reactivity with a welding electrode and makes weldability significantly unstable. On the other hand, reactivity of the Al—Zn phase with the electrode is lower than that of the Al phase because the fine Al phase is contained together with the fine Zn phase in the phase. Furthermore, a thin coating that adversely affects weldability, such as an Al$_2$O$_3$ oxide film is not formed on a surface of the metallic coating layer, resulting in improvement of weldability.

In the present embodiment, since the metallic coating layer contains a certain concentration or more of Al, 0 to 15 area % of Al phase is formed depending on manufacturing conditions. However, by carefully selecting a manufacturing method, it is possible to suppress formation of the Al phase in a block shape or a dendritic shape, and to allow a large amount of Al to exist as the Al—Zn phase. That is, as the Al—Zn phase increases, the Al phase can be reduced. In addition, the Al—Zn phase is less likely to react with the copper electrode or the like as compared with the Al phase, and tends to widen the suitable welding current range. Therefore, it is convenient from a viewpoint of weldability that Al exists as the Al—Zn phase by incorporating Zn into the Al phase as much as possible rather than existing in the metallic coating layer as the Al phase.

The area fraction of the Al—Zn phase in the metallic coating layer is set to be a range of 0 to 15 area %. In the range of the average chemical composition of the metallic coating layer in the present embodiment as described above, it is difficult to set the area fraction of the Al—Zn phase to more than 15%, and therefore the upper limit of the area fraction of the Al—Zn phase is set to be 15 area % or less.

$CaZn_{13}$ Phase

The $CaZn_{13}$ phase in the present embodiment is a region where a Ca concentration is 5% (+3%) and a Zn concentration is 95 (+3%) in the metallic coating layer. Since the $CaZn_{13}$ phase is often indicated in white in a SEM reflected electron image, it is difficult to distinguish the $CaZn_{13}$ phase from the Zn phase as it is in a captured image. Therefore, by taking an EDS image, it is possible to distinguish the $CaZn_{13}$ phase from other constituent phases. The $CaZn_{13}$ phase is melted in a small amount during welding, and the melted Ca immediately forms an oxide film and covers a surface of the copper electrode, thereby acting as a barrier against a reaction of the Zn phase and the Al phase with the copper electrode. That is, by inclusion of the $CaZn_{13}$ phase in the metallic coating layer, the suitable welding current range is widened, and the number of continuous spotting points tends to increase. In addition, the $CaZn_{13}$ phase is precipitated as a primary phase during solidification of plating, acts as a solidification nucleus of the $MgZn_2$ phase described above, and has an effect of promoting growth of the $MgZn_2$ phase during solidification of plating. The coarsened $MgZn_2$ phase improves weldability.

Therefore, the $CaZn_{13}$ phase is set to be a range of 1.0 to 15 area %. In the range of the average chemical composition of the metallic coating layer, it is difficult to set the area fraction of the $CaZn_{13}$ phase to more than 15%, and therefore the upper limit of the area fraction of the $CaZn_{13}$ phase is set to be 15 area % or less. In addition, by setting the $CaZn_{13}$ phase to 1.0 area % or more, the suitable welding current range is widened, and the number of continuous spotting points also increases.

In addition, when a grain size of the $CaZn_{13}$ phase in the metallic coating layer is largely increased, the metallic coating layer is hardly melted by heat input in spot welding and hardly reacts with the electrode. That is, the electrode life property in spot welding can be further improved. Therefore, among the $CaZn_{13}$ phases, an average circle-equivalent diameter of top 80% $CaZn_{13}$ phases having larger circle equivalent diameters is preferably 10 μm or more. For example, when there are 100 $CaZn_{13}$ phases in an observed visual field, it is only required to obtain an average of the circle equivalent diameters of top 80 $CaZn_{13}$ phases in descending order of the circle equivalent diameters. Note that a visual field of 25000 μm² in total in a cross section of the metallic coating layer is defined as the observed visual field of the $CaZn_{13}$ phase. That is, it is only required to obtain the circle equivalent diameter of each of the $CaZn_{13}$ phases of the metallurgical structure in the visual field of 25000 μm² in total in the cross section of the metallic coating layer, and to obtain an average of the circle equivalent diameters of top 80% $CaZn_{13}$ phases in descending order of the circle equivalent diameters.

Ca forms a $CaZn_{11}$ phase and a $CaZn_5$ phase in addition to the $CaZn_{13}$ phase as a compound with Zn. However, in the bath composition of the present embodiment, since the ratio of the phases other than the $CaZn_{13}$ phase is small, there is little influence of the phases other than the $CaZn_{13}$ phase on weldability and corrosion resistance. As a representative compound with Al, an $Al_2CaZn_2$ phase may be formed. However, since a formation ratio of the $Al_2CaZn_2$ phase in the present embodiment is also small, there is little influence of the $Al_2CaZn_2$ phase on weldability and corrosion resistance. The $CaZn_{13}$ phase and the other phases can be distinguished from each other in wide-angle X-ray diffraction.

Ca forms an $Al_2CaSi_2$ phase as a compound with Al and Si. The $Al_2CaSi_2$ phase is melted in a small amount during welding similarly to the $CaZn_{13}$ phase, and covers the electrode, thereby having an effect of improving weldability. However, since the $Al_2CaSi_2$ phase tends to be precipitated at an interface between the metallic coating layer and the steel material, the effect of improving weldability is inferior to that of the $CaZn_{13}$ phase. That is, the $CaZn_{13}$ phase is preferably precipitated rather than the $Al_2CaSi_2$ phase.

[Eutectic Structure]

In the composition of the present embodiment, a [ternary eutectic structure of $Al/MgZn_2/Zn$] and a [binary eutectic structure of $MgZn_2/Zn$] are formed by a eutectic reaction. The Zn phase in these eutectic structures has a smaller degree of influence than the Al phase, but reacts with the copper electrode during spot welding, and adversely affects a continuous spotting point life.

The eutectic structure is observed as a lamellar microstructure in a SEM image, and therefore can be clearly distinguished from other structures.

[Ternary Eutectic Structure of $Al/MgZn_2/Zn$]

The [ternary eutectic structure of $Al/MgZn_2/Zn$] is a eutectic structure containing an Al phase, an $MgZn_2$ phase, and a Zn phase, and is clearly distinguished from the $MgZn_2$ phase and the above-described Al phase in a reflected electron SEM image.

The [ternary eutectic structure of $Al/MgZn_2/Zn$] contains a Zn phase. This Zn phase is a region where a Zn concentration is 95 mass % or more and a Ca concentration is less than 2%. The Zn phase in the [ternary eutectic structure of $Al/MgZn_2/Zn$] is often photographed in the whitest color in a SEM reflected electron image. The Al phase contained in the [ternary eutectic structure of $Al/MgZn_2/Zn$] is contained as a fine Al phase together with an $MgZn_2$ phase and the Zn phase. Therefore, reactivity of the Al phase with the electrode is lower than that of the above-described Al phase, and a thin coating that adversely affects weldability, such as an $Al_2O_3$ oxide film is not formed on a surface of the metallic coating layer, resulting in improvement of weldability.

[Binary Eutectic Structure of $MgZn_2/Zn$]

The [binary eutectic structure of $MgZn_2/Zn$] is a eutectic structure containing an $MgZn_2$ phase and a Zn phase, and is clearly distinguished from the $MgZn_2$ phase, the Al phase, and the [ternary eutectic structure of $Al/MgZn_2/Zn$] in a reflected electron SEM image.

The [binary eutectic structure of $MgZn_2/Zn$] contains a Zn phase. This Zn phase is a region where a Zn concentration is 95 mass % or more and a Ca concentration is less than 2%. The Zn phase in the [binary eutectic structure of $MgZn_2/Zn$] is often photographed in the whitest color in a SEM reflected electron image. The [binary eutectic structure of $MgZn_2/Zn$] does not contain an Al phase. Therefore, the adverse influence of the [binary eutectic structure of $MgZn_2/Zn$] on the electrode life property in spot welding is smaller than that of the [ternary eutectic structure of $Al/MgZn_2/Zn$].

On the other hand, when a total area fraction of the [ternary eutectic structure of $Al/MgZn_2/Zn$] and the [binary eutectic structure of $MgZn_2/Zn$] is less than 30.0 area %, the Zn phase decreases as the area fraction decreases, the sacrificial corrosion resistance of the metallic coating layer decreases, and corrosion resistance cannot be maintained. Therefore, it is effective to set the total area fraction of the [ternary eutectic structure of $Al/MgZn_2/Zn$] and the [binary eutectic structure of $MgZn_2/Zn$] to 30.0 area % or more. That is, the existence of the [ternary eutectic structure of $Al/MgZn_2/Zn$] and the [binary eutectic structure of $MgZn_2/Zn$] containing the Zn phase in the metallic coating layer to some extent makes it possible to ensure sacrificial corrosion resistance and to improve corrosion resistance around a weld. In addition, Al in the metallic coating layer is incorporated into the [ternary eutectic structure of $Al/MgZn_2/Zn$] as much as possible, and the area fraction of the Al phase not contained in the [ternary eutectic structure of $Al/MgZn_2/Zn$] is reduced, whereby the electrode life property in spot welding can be improved. The upper limit of the area fraction of the [ternary eutectic structure of $Al/MgZn_2/Zn$] and the [binary eutectic structure of $MgZn_2/Zn$] is not particularly limited, but may be 85.0 area % or less, 80.0 area % or less, 75.0 area % or less, 70.0 area % or less, or 65.0 area % or less.

On the other hand, when an element other than Zn, Mg, and Al is contained in the metallic coating layer, another metal phase may be formed. For example, Si forms an $Mg_2Si$ phase or the like. Some of the other metal phases are effective in improving weldability and corrosion resistance, but an influence thereof is not remarkable. From the composition of the metallic coating layer of the present embodiment, it is difficult to set the total area fraction of the other metal phases to more than 10 area %, and therefore the area fraction of the other metal phases is preferably 10 area % or less.

Next, a case where the metallic coated steel of the present embodiment is manufactured by a hot-dip plating method will be described. The metallic coated steel of the present embodiment can be manufactured by either an immersion type plating method (batch type) or a continuous type plating method.

The size, shape, surface form, and the like of a steel material to be coated are not particularly limited. An ordinary steel material, high tensile strength steel, stainless steel, and the like are applicable as long as they are steel materials. A steel strip of general structural steel is most preferable. A surface may be finished by shot blasting, brush grinding, or the like in advance. There is no problem even if plating is performed after a metal film or an alloy film of Ni, Fe, Zn, Sn, plating, or the like is attached at a thickness of 1 μm or less to the surface. In addition, as a pretreatment of the steel material, it is preferable to sufficiently clean the steel material by degreasing and pickling.

After the surface of the steel material is sufficiently heated and reduced by a reducing gas such as $H_2$, the steel material is immersed in a plating bath prepared to contain predetermined components. In high tensile strength steel and the like, it is common to humidify the atmosphere during annealing and to ensure plating adhesion of high Si, Mn steel and the like by utilizing an internal oxidation method and the like. By performing such a treatment, a metallic coated steel with less bare spots and fewer external appearance defects can be usually coated in a similar manner to a general steel material. In such a steel material, a grain-based fine surface of the steel material and an internal oxide film layer are observed on a base metal side, but do not affect the performance of the present invention.

In a case of a hot-dip plating method, the components of the metallic coating layer can be controlled by the components of a plating bath to be formed. In formation of the plating bath, an alloy of the plating bath components is prepared by mixing predetermined amounts of pure metals, for example, by a dissolution method under an inert atmosphere. In the case of the present embodiment, it is only required to make the components of the plating bath substantially the same as the chemical components of a metallic coating layer to be manufactured.

By immersing the steel material whose surface has been reduced in the plating bath maintained at a predetermined concentration, a metallic coating layer having substantially the same components as those of the plating bath is formed. When an immersion time is long or it takes a long time to complete solidification, formation of the interfacial alloy layer is active, and therefore an Fe concentration in the metallic coating layer may increase. In such a case, the Fe content in the metallic coating layer can be suppressed by lowering a bath temperature. Specifically, since a reaction with the metallic coating layer can be rapidly slowed by setting the bath temperature to less than 500° C., the amount of Fe contained in the metallic coating layer can be usually less than 5.0% even when active formation of the interfacial alloy layer is concerned.

In order to form a hot-dip coating layer, it is preferable to keep the plating bath at 450° C. to 550° C. Then, it is preferable to immerse the reduced steel material for several seconds in the plating bath. On a surface of the reduced steel material, Fe may diffuse into the plating bath and react with the plating bath to form an interfacial alloy layer (mainly an Al—Fe-based intermetallic compound layer) at an interface between the metallic coating layer and the steel material. When the interfacial alloy layer is formed, the steel material below the interfacial alloy layer and the metallic coating layer above the interfacial alloy layer are metal-chemically bonded to each other more firmly.

After the steel material is immersed in the plating bath for a predetermined time, the steel material is pulled up from the plating bath. When a metal attached to a surface of the steel material is in a molten state, $N_2$ wiping is performed, whereby the thickness of the metallic coating layer is adjusted to a predetermined thickness. The thickness of the metallic coating layer is preferably adjusted to 3 to 80 μm. When the thickness is converted into an adhesion amount of the metallic coating layer, the adhesion amount is 20 to 500 $g/m^2$ per surface. The thickness of the metallic coating layer may also be adjusted to 5 to 70 μm. When the thickness is converted into an adhesion amount, the adhesion amount is about 30 to 400 $g/m^2$ per surface.

After the adhesion amount of the metallic coating layer is adjusted, the attached molten metal is solidified to form a metallic coating layer. A cooling means during solidification of the metallic coating layer may be performed by blowing nitrogen, air, or a mixed gas of hydrogen and helium, mist cooling, or immersion in water. Mist cooling is preferable, and mist cooling in which water is contained in nitrogen is more preferable. The cooling rate during solidification of the metallic coating layer is preferably adjusted by the content ratio of water.

Under plating solidification conditions under normal operating conditions, it has been found that predetermined performance is not satisfied in some case because desired microstructure control cannot be performed in some cases. Therefore, a cooling step capable of obtaining the metallic coating layer of the present embodiment will be described below.

Average Cooling Rate Between Bath Temperature and 400° C.: Less than 20° C./sec

The temperature range of the bath temperature to 400° C. is a temperature range in which $CaZn_{13}$ and an $MgZn_2$ phase are actively formed. In this temperature range, solidification of the metallic coating layer gradually starts. In the case of the average chemical composition of the metallic coating layer in the present embodiment, a nucleus that is first solidified from the hot-dip coating layer is $CaZn_{13}$ except for a trace amount of an intermetallic compound phase, and usually $CaZn_{13}$ is formed as a primary phase. After the precipitation of $CaZn_{13}$, the $MgZn_2$ phase is precipitated, and the $MgZn_2$ phase is a main phase in the vicinity of 380° C.

In addition, in the temperature range of the bath temperature to 400° C., an Al—Zn phase, an Al phase, and a Zn phase, which are other phases, are hardly formed. On the other hand, when the average cooling rate in the temperature range of the bath temperature to 400° C. is high, solidification proceeds in a non-equilibrium manner, and therefore even in the plating composition according to the present embodiment, a small amount of an Al—Zn phase or an Al phase having a Zn concentration of less than 10 mass % may be formed. In particular, when the Al content of the plating bath is high, an Al phase tends to be formed, and when the amount of the Al phase is excessive, weldability is impaired as described above. In addition, the Al—Zn phase and the Al phase slightly solid-dissolve Ca. Therefore, when the Al—Zn phase and the Al phase are formed, the $CaZn_{13}$ phase tends to decrease. Therefore, the average cooling rate between the bath temperature and 400° C. is set to be less than 20° C./sec When cooling is performed at an average cooling rate of 20° C./sec or more between the bath temperature and 400° C., an Al phase is generated by non-equilibrium solidification, the $CaZn_{13}$ phase decreases, and weldability of the metallic coating layer is deteriorated. On the other hand, when cooling is performed at a rate of less than 20° C./sec until the temperature reaches 400° C., plating solidification approaches equilibrium solidification, and Al is precipitated as an Al—Zn phase. Therefore, an Al phase due to non-equilibrium solidification is not generated.

In addition, when cooling is performed at an average cooling rate of more than 10° C./sec between the bath temperature and 400° C., a grain size of $CaZn_{13}$ decreases, and the electrode life property in spot welding is not sufficiently improved in some cases. Therefore, in order to set the circle equivalent grain size of the top 80% $CaZn_{13}$ phases to 10 μm or more, the average cooling rate between the bath temperature and 400° C. is preferably set to be 10° C./sec or less, and more preferably set to be 5° C./sec or less. In addition, when the average cooling rate between the bath temperature and 400° C. is set to be more than 10° C./sec, the ratio of the $MgZn_2$ phase contained in the eutectic structure may increase without growth of the $MgZn_2$ phase, and spot weldability may deteriorate. Therefore, the average cooling rate between the bath temperature and 400° C. is preferably 10° C./sec or less. In order to improve spot weldability, it is preferable to grow the $MgZn_2$ phase as described above. Therefore, it is preferable to reduce the average cooling rate between the bath temperature and 400° C. as much as possible.

Average Cooling Rate Between 400° C. and 380° C.: 2° C./sec or Less

In addition, when the cooling rate in a temperature range in which the temperature of the metallic coating layer is 400 to 380° C. is set to be more than 2° C./sec, the $MgZn_2$ phase in the metallic coating layer may be coarse. Therefore, the average cooling rate in the temperature range between 400° C. and 380° C. is desirably set to be 2° C./sec or less. In addition, during cooling between 400° C. and 380° C., a high-temperature gas containing fine particles of ZnO, $Al_2O_3$, or the like having a diameter of 0.5 μm or less is sprayed onto a surface of the metallic coating layer to form a solidification nucleus site of $MgZn_2$, whereby growth of the $MgZn_2$ phase can be promoted.

Average Cooling Rate Between 380° C. and 300° C.: More than 20° C./sec

In the average bath composition of the plating bath according to the present embodiment, a temperature range between 380° C. and 300° C. is a temperature range in which Al is easily released from the Zn phase. When Al is released from the Zn phase, a volume percentage occupied by the Al—Zn phase as a high-temperature stable phase increases, and the volume fraction of the ternary eutectic of the Zn—Al—$MgZn_2$ phase tends to decrease. Therefore, in order to further increase corrosion resistance, it is effective to increase the average cooling rate in the temperature range between 380° C. and 300° C. to suppress release of Al from the Zn phase. Specifically, the average cooling rate in the temperature range between 380° C. and 300° C. is set to be more than 20° C./sec. The average cooling rate is preferably set to be 30° C./sec or more, and more preferably set to be 50° C./sec or more.

Average Cooling Rate Between 300° C. and 150° C.: More than 20° C./sec.

A temperature range between 300° C. and 150° C. is a region where the Al phase is stable. That is, when the metallic coating layer is held in the temperature range between 300° C. and 150° C., the fine Zn phase incorporated into the Al—Zn phase may be rapidly discharged from the Al—Zn phase. In addition, the fine Al phase in the eutectic structure may grow. It is preferable to rapidly perform cooling in this temperature range because the higher the temperature, the more active atom transfer. When the average cooling rate between 300 to 150° C. is 20° C./sec or less, the Al—Zn phase is separated into a fine Al phase and a fine Zn phase. In particular, the higher the Al concentration, the stronger the tendency. In order to suppress generation of the Al phase in a block shape or a dendritic shape from the fine Al phase and to set the area fraction of the Al phase having a Zn concentration of less than 10 mass % to 5% or less, it is effective to set the average cooling rate between 300° C. and 150° C. to more than 20° C./sec. The average cooling rate is preferably set to be 30° C./sec or more, and more preferably set to be 50° C./sec or more.

Temperature Range of Lower than 150° C.

A cooling rate in a temperature range of lower than 150° C. in the solidification process often does not significantly affect a constituent phase in the metallic coating layer. Therefore, there is no need to limit cooling conditions in the temperature range of lower than 150° C., and natural air cooling may be performed.

After the metallic coating layer is cooled, various chemical conversion treatments and coating treatments may be performed. In addition, in order to further enhance corrosion resistance, repair touch-up paint, a thermal spraying treatment, and the like may be performed in a weld, a processed portion, and the like.

In the metallic coated steel of the present embodiment, a coating may be formed on the metallic coating layer. The coating can be formed of one layer or two or more layers. Examples of the type of the coating immediately above the metallic coating layer include a chromate coating, a phosphate coating, and a chromate-free coating. A chromate treatment, a phosphating treatment, and a chromate-free treatment for forming these coatings can be performed by known methods. Note that the chromate treatment may often deteriorate weldability on a surface of the metallic coating layer. Therefore, in order to sufficiently draw out a weldability improving effect in the metallic coating layer, the thickness of the chromate coating is preferably set to be less than 1 μm.

The chromate treatment includes an electrolytic chromate treatment in which a chromate coating is formed by electrolysis, a reaction type chromate treatment in which a coating is formed by utilizing a reaction with a material and then an excess treatment liquid is washed away, and an application type chromate treatment in which a coating is formed by applying a treatment liquid to an object to be coated and drying the treatment liquid without washing with water. When the chromate treatment is performed in the present embodiment, any treatment may be adopted.

Examples of the electrolytic chromate treatment include an electrolytic chromate treatment using chromic acid, a silica sol, a resin (phosphoric acid, an acrylic resin, a vinyl ester resin, a vinyl acetate acrylic emulsion, a carboxylated styrene-butadiene latex, a diisopropanolamine-modified epoxy resin, and the like), and hard silica.

Examples of the phosphating treatment include a zinc phosphate treatment, a zinc calcium phosphate treatment, and a manganese phosphate treatment.

The chromate-free treatment includes an electrolytic chromate-free treatment in which a chromate-free coating is formed by electrolysis, a reaction type chromate-free treatment in which a coating is formed by utilizing a reaction with a material and then an excess treatment liquid is washed away, and an application type chromate-free treatment in which a coating is formed by applying a treatment liquid to an object to be coated and drying the treatment liquid without washing with water. Any treatment may be adopted.

When the coating on the metallic coating layer has a certain thickness, it can be confirmed by element mapping that a main component element of each treatment is concentrated on the metallic coating layer, and the coating can be distinguished from the metallic coating layer. In addition, in a cross-sectional SEM reflected electron image, the coating can be distinguished from the metallic coating layer as a coating having a contrast different from that on the metallic coating layer. Therefore, the SEM reflected electron image can also be used supplementarily.

Since the coating on the metallic coating layer is thinner than the metallic coating layer, even if the metallic coating layer is acid-dissolved together with the coating and component analysis is performed, the composition of the metallic coating layer does not largely change. In addition, as a method for analyzing the composition of the metallic coating layer from which the coating has been removed, there is a method for analyzing a metallic coated steel obtained by scraping a surface of the metallic coated steel by 1 μm by grinding, that is, a metallic coated steel obtained by removing the coating film by grinding. Specifically, an acid solution is obtained in which the metallic coating layer is peeled and dissolved with an acid containing an inhibitor that suppresses corrosion of the steel material (base metal). Next, the obtained acid solution is measured by ICP emission spectrometry or ICP-MS, whereby the chemical composition of the metallic coating layer can be obtained.

Furthermore, one or more organic resin coatings may be formed on the coating immediately above the metallic coating layer. The organic resin is not limited to a specific type, and examples thereof include a polyester resin, a polyurethane resin, an epoxy resin, an acrylic resin, a polyolefin resin, and modified products of these resins. Here, the modified product refers to a resin obtained by causing a reactive functional group included in the structures of these resins to react with another compound (a monomer, a crosslinking agent, or the like) having a functional group capable of reacting with the functional group in a structure thereof.

As such an organic resin, one or more types of organic resins (unmodified organic resins) may be mixed and used, or one or more types of organic resins obtained by modifying, in the presence of at least one type of organic resin, at least one type of other organic resin may be mixed and used. The organic resin coating may contain any coloring pigment or antirust pigment. It is also possible to use a water-based pigment prepared by melting or dispersing these pigments in water.

These organic resin coatings mainly contain light elements such as C and O, appear darker than the metallic coating layer on a cross-sectional SEM reflected electron image, and therefore can be easily distinguished from the metallic coating layer.

In component analysis of the metallic coating layer of the metallic coated steel with the organic resin coating, there is a method in which a metallic coated steel obtained by removing the organic resin coating with a peeling agent and then scraping a surface of the metallic coated steel by 1 μm by grinding, that is, a metallic coated steel obtained by removing the coating by grinding is used as an analysis target. Specifically, an acid solution is obtained in which the metallic coating layer is peeled and dissolved with an acid containing an inhibitor that suppresses corrosion of the steel material (base metal). Next, the obtained acid solution is measured by ICP emission spectrometry or ICP-MS, whereby the chemical composition can be obtained.

A method for evaluating spot weldability of a metallic coated steel and a method for evaluating corrosion resistance around a spot-welding portion will be described.

<Evaluation of Suitable Welding Current Range>

A suitable welding current range of a welding current in spot welding is evaluated by preparing a plurality of test pieces. The test piece may be, for example, a metallic coated steel using a mild steel sheet having a sheet thickness of 0.8 mm as a steel material. When a chemical conversion coating is formed on a surface of the metallic coating layer, a portion to be welded is polished with sandpaper or the like to peel the chemical conversion coating. The adhesion amount or the thickness of the metallic coating layer in each sample is preferably constant, and when the thickness of the metallic coating layer is around 20 μm, a difference in spot weldability tends to be most likely to occur. Therefore, the thickness of the metallic coating layer is set to be 20 μm. As a sample, one in which metallic coating layers are formed on both surfaces of a steel sheet is used. As the sample, a test piece having a size of 30×50 mm is cut out from the metallic coated steel.

Next, a spot-welding machine searches for a recommended welding condition. An electrode material is a Cu—Cr-based alloy. The shape of the electrode is a dome shape. A welding time, a pressurizing force, a cooling capacity, a Sq. time, an Up. time, a Down. time, and the like are adjusted for each sample, and a welding basic condition enabling spot welding is searched for. As the welding basic condition, it is preferable to search for a welding condition that is constant even if the plated steel sheet is changed as much as possible. When the welding basic condition is found, temporary spotting is first performed for ten spotting points in order to make an electrode surface state constant, and then welding is performed while a welding current value is varied from a low side to a high side. The current value is preferably increased in increments of 0.1 kA. After spot welding at each welding current, an overlapping test piece is embedded in a resin, and a nugget diameter at a center of a spot-welding portion is measured. A current value satisfying a specified value, a nugget diameter of $4 \times \sqrt{t}$ (t=the sheet thickness of the plated steel sheet used) is defined as the lower limit of the suitable welding current range. In addition, a current value at which expulsion is generated is defined as the upper limit of the suitable welding current range. The difference between the upper limit and the lower limit is the suitable welding current range. A plated steel sheet having a larger suitable welding current range is more easily spot-welded, and conversely, a plated steel sheet having a narrower suitable welding current range is more hardly spot-welded.

<Evaluation of Electrode Life Property in Spot Welding>

A life of a spot-welding electrode also depends on a metallic coated steel. That is, if a metallic coated steel can be spot-welded many times at a current value within a suitable welding current range without replacing a surface of an electrode, manufacturing cost and manufacturing time can be shortened, and it can be said that the metallic coated steel is more preferable. Specifically, a median value of the suitable welding current range is defined as a welding current, and spot welding is continuously performed.

When spot welding is repeatedly performed, Ca, Mg, Al, Zn, and the like, which are metal elements on a surface of the metallic coating layer, react with the electrode to change the electrode shape. The electrode shape can be simply measured with pressure-sensitive paper or the like during spot welding. As the number of spot welds increases, the nugget diameter of the spot welding gradually decreases. The number of spotting points when a case where the nugget diameter is less than $2 \times \sqrt{t}$ (t represents the sheet thickness of the steel material) continuously occurs three times is defined as the number of continuous spotting points. It can be said that as this value is larger, wear of the electrode is smaller, and the metallic coated steel has a better electrode life property in spot welding.

<Corrosion Resistance Around Spot-Welding Portion>

Two plated steel sheets having a size of 70×150 mm and a size of 30×75 mm are prepared, center portions of the plated steel sheets are laid to overlap each other, and two spot-welding portions are formed at positions 20 mm away from the center portion. The nugget diameter is adjusted to $4\sqrt{t}$ or more (t represents the sheet thickness of the steel material). In this way, an overlapping test piece is prepared. Only an end surface portion of the plated steel sheet having a size of 70×150 mm is repaired with an epoxy-based resin coating material, and is put into a corrosion tester as it is. After a lapse of a predetermined time in the corrosion tester, corrosion is most likely to proceed in the overlapping portion, and therefore a red rust generation status is confirmed by dividing the overlapping portion. It is determined that as a test piece has a longer period before generation of red rust, the test piece has higher corrosion resistance around a weld, and is more suitable as a spot welding material.

Next, a method for evaluating bath stability will be described.

<Bath Stability>

Examples of a condition under which the Zn—Al—Mg-based plating bath has bath stability sufficient for operation include that Mg in the bath does not cause abnormal oxidation. That is, when Mg in the bath causes abnormal oxidation, black oxide is generated on a surface of the bath, which makes the operation difficult. On the other hand, the Zn-based oxide is a white-based oxide, and therefore can be clearly distinguished from a black oxide due to abnormal oxidation of Mg in external appearance.

The bath stability can be evaluated by allowing the plating bath in a molten state to stand in the atmosphere. Specifically, a base metal is melted such that the bath amount of the plating bath adjusted to have a predetermined bath composition is 10 kg. The base metal to be used is not limited as long as it has a known composition, and for example, a Zn base metal, an Al base metal, an Mg base metal, or an Al—Ca alloy base metal may be used. The melted plating bath is allowed to stand in the atmosphere at a bath temperature 30° C. higher than its melting point for 24 hours. A bath surface after being allowed to stand is observed, and if black oxide is generated, it is determined that the plating bath is unstable. On the other hand, when there is no generation of a black oxide, it is determined that the plating bath has sufficient bath stability for operation.

Examples

As presented in Tables 1A to 3C, metallic coated steels of Nos. 1 to 57 were manufactured, and performance thereof was evaluated.

A plating bath was formed by mixing pure metals. An Fe powder was added to the components of the plating alloy after the plating bath was formed such that an Fe concentration did not increase during a test. As for the components of the plating bath, a metal piece obtained by solidifying the plating bath was dissolved in an acid, and the resulting solution was analyzed by ICP emission spectrometry. In addition, the components of the metallic coating layer were confirmed by peeling the metallic coating layer with hydrochloric acid to which an inhibitor was added and performing component analysis after plating peeling. Except for the Fe component, most of the components of the metallic coating layer coincided with the plating bath component values within a range of ±0.5%. Note that the amount of Zn in the metallic coating layer was 65% or more in each of the samples.

An original sheet of the metallic coated steel was cut out in a size of 180 mm×100 mm from a cold-rolled steel sheet having a thickness of 0.8 mm. The original sheets were SS400 (general steel).

Next, using a batch type hot-dip plating simulator (manufactured by RHESCA CO., LTD.), a K thermocouple was attached to a part of the steel sheet, and the steel sheet was annealed at 800° C. in a reducing atmosphere of $N_2$ containing 5% of $H_2$ to sufficiently reduce a surface of the steel sheet. Then, the plated original sheet after annealing was immersed in the plating bath for three seconds, and then pulled up, and the plating thickness was adjusted to 20 μm (+1 μm) by $N_2$ gas wiping. All surfaces of the original sheet had the same thickness of the metallic coating layer. After the plated original sheet was pulled up from the plating bath, metallic coated steels were manufactured under various cooling conditions of the following A to F.

Condition A: After the steel material was pulled up from the plating bath, the average cooling rate between the bath temperature and 400° C. was set to be 10° C./sec, the average cooling rate between 400° C. and 380° C. was set to be 2° C./sec, and the average cooling rates between 380° C. and 300° C. and between 300° C. and 150° C. were set to be 25° C./sec. When the temperature was lower than 150° C., a sample was air-cooled.

Condition A-2: After the steel material was pulled up from the plating bath, the average cooling rate between the bath temperature and 400° C. was set to be 5° C./sec, the average cooling rate between 400° C. and 380° C. was set to be 2° C./sec, and the average cooling rates between 380° C. and 300° C. and between 300° C. and 150° C. were set to be 50° C./sec. When the temperature was lower than 150° C., a sample was air-cooled.

Condition A-3: After the steel material was pulled up from the plating bath, the average cooling rate between the bath temperature and 400° C. was set to be 5° C./sec, the average cooling rate between 400° C. and 380° C. was set to be 2° C./sec, the average cooling rate between 380° C. and 300° C. was set to be 30° C./sec, and the average cooling rate between 300° C. and 150° C. was set to be 50° C./sec. When the temperature was lower than 150° C., a sample was air-cooled.

Condition A-4: After the steel material was pulled up from the plating bath, the average cooling rate between the bath temperature and 400° C. was set to be 5° C./sec, the average cooling rate between 400° C. and 380° C. was set to be 2° C./sec, the average cooling rate between 380° C. and 300° C. was set to be 50° C./sec, and the average cooling rate between 300° C. and 150° C. was set to be 30° C./sec. When the temperature was lower than 150° C., a sample was air-cooled.

Condition A-5: After the steel material was pulled up from the plating bath, the average cooling rate between the bath temperature and 400° C. was set to be 5° C./sec, the average cooling rate between 400° C. and 380° C. was set to be 2° C./sec, and a high-temperature gas containing $Al_2O_3$ and having φ of 0.5 μm was sprayed during cooling at 400 to 380° C. The average cooling rates between 380° C. and 300° C. and between 300° C. and 150° C. were set to be 50° C./sec. When the temperature was lower than 150° C., a sample was air-cooled.

Condition B (comparative condition): After the steel material was pulled up from the plating bath, the average cooling rate between the bath temperature and 150° C. was set to be 20° C./sec. When the temperature was lower than 150° C., a sample was air-cooled.

Condition C (comparative condition): After the steel material was pulled up from the plating bath, the average cooling rate between the bath temperature and 150° C. was set to be 2° C./sec. When the temperature was lower than 150° C., a sample was air-cooled.

Condition D (comparative condition): After the steel material was pulled up from the plating bath, the average cooling rate between the bath temperature and 150° C. was set to be 10° C./sec. When the temperature was lower than 150° C., a sample was air-cooled.

Condition E (comparative condition): After the steel material was pulled up from the plating bath, the average cooling rate between the bath temperature and 400° C. was set to be 10° C./sec, the average cooling rate between 400° C. and 380° C. was set to be 15° C./sec, and the average cooling rates between 380° C. and 300° C. and between 300° C. and 150° C. were set to be 15° C./sec. When the temperature was lower than 150° C., a sample was air-cooled.

Condition F (comparative condition): After the steel material was pulled up from the plating bath, the average cooling rate between the bath temperature and 400° C. was set to be 30° C./sec, the average cooling rate between 400° C. and 380° C. was set to be 2° C./sec, and the average cooling rates between 380° C. and 300° C. and between 300° C. and 150° C. were set to be 30° C./sec. When the temperature was lower than 150° C., a sample was air-cooled.

Condition G (Example condition): After the steel material was pulled up from the plating bath, the average cooling rate between the bath temperature and 400° C. was set to be 15° C./sec, the average cooling rate between 400° C. and 380° C. was set to be 15° C./sec, and the average cooling rates between 380° C. and 300° C. and between 300° C. and 150° C. were set to be 30° C./sec. When the temperature was lower than 150° C., a sample was air-cooled.

A sample for evaluation of spot welding and a sample for corrosion test after spot welding were cut out from each of the manufactured plated steel sheets.

(Spot Welding Condition)

A servo pressurization type stationary spot-welding machine (air pressurization type) was used. A single-phase AC type power source was used, and a frequency of the power source was set to be 50 Hz. As an electrode, dome-type chromium copper 40R (φ 6 mm) was used. Basic conditions were as follows: a pressurizing force of 250 kg, a squeeze time of 30 cycles, an upslope of 10 cycles, an energization time of 10 cycles, a retention time of 10 cycles, and a cooling water flow rate of 15 liters/minute. As necessary, the number of the cycles was changed within a range of +10 cycles. A weld lobe curve was drawn in increments of 0.2 kA required. First, in order to make an electrode surface state constant, temporary spotting was performed at 10 kA for ten points in advance.

(Suitable Welding Current Range)

Temporary spotting was performed for ten spotting points under the welding basic condition, and then welding was performed while a welding current value was varied from a low side to a high side. The current value was increased in increments of 0.1 kA. Spot welding was performed at each welding current. Then, the overlapping test piece was embedded in a resin, polished, and etched with 3% nital to obtain a sample, and a cross section of the sample was observed with an optical microscope to measure a nugget diameter. A width of a current value from a current value at which the nugget diameter of a weld was 4×√t=3.58 or more to a current value at which expulsion was generated was defined as a suitable welding current range. The suitable welding current range was evaluated as follows. "B" was defined as unacceptable, and "A" to "S" were defined as acceptable. The results are presented in Tables 3A to 3C.

less than 1.2 kA: "B"
1.2 to less than 1.5 kA: "A"
1.5 to less than 1.7 kA: "AA"
1.7 to less than 1.9 kA: "AAA"
1.9 kA or more: "S"

(Electrode Life Property in Spot Welding)

As the current value, a median value of the suitable welding current range was adopted, and two samples were laid to overlap each other and spot welding was continuously performed. At every 50 points, a weld of the overlapping sheet was cut out and embedded in a resin, and then polished, and etched with 3% nital to obtain a sample, and a cross section of the sample was observed with an optical microscope to confirm a nugget diameter. When a level at which the nugget diameter was less than 2×√t continuously occurred three times, the number of spotting points at which the nugget diameter was less than 2×√t for the first time among the three continuous levels was defined as the number of continuous spotting points. "B" was defined as unacceptable, and "A" to "S" were defined as acceptable. The results are presented in Tables 3A to 3C.

less than 150 points: "B"
150 to less than 250 points: "A"
250 to less than 500 points: "AA"
500 to less than 750 points: "AAA"
750 points or more: "S"

(Evaluation of Corrosion Resistance Around Spot-Welding Portion)

Two plated steel sheets having a size of 70×150 mm and a size of 30×75 mm were prepared and laid to overlap each other at center portions thereof, and spot welding was performed at two spotting points (nugget diameter: 4√t or more) 20 mm away from the center to prepare an overlapping test piece. The overlapping test piece was put into a combined cycle corrosion tester and subjected to a corrosion test in accordance with JASO, M609-91. After 150 cycles, the overlapping portion was peeled every 30 cycles, and a red rust generation status (red rust was generated at a red rust area fraction of 1% or more) was confirmed.

Corrosion resistance was evaluated as follows. "B" was defined as unacceptable, and "A" to "S" were defined as acceptable. The results are presented in Tables 3A to 3C.

Generation of red rust was observed in less than 150 cycles: "B"
Red rust was generated in 150 to 180 cycles: "A"
Red rust was generated in 210 to 240 cycles: "AA"
Red rust was generated in 270 to 300 cycles: "AAA"
Red rust was not generated in 300 cycles: "S"

(Bath Stability)

In the atmosphere, a base metal was melted in a graphite crucible such that the bath amount was 10 kg to prepare a plating bath having a predetermined composition. After the preparation of the plating bath, the plating bath temperature was set to be 30° C. higher than its melting point. The bath temperature was measured by immersing an alumina protective pipe into which a K thermocouple was inserted in the plating bath. After the bath temperature was stabilized within a range of +5° C. from the set temperature, dross on a bath surface was scraped off, and the plating bath was allowed to stand in the atmosphere for 24 hours. After the plating bath was allowed to stand for 24 hours, the bath surface was observed, and a generation status of black oxide was confirmed. Bath stability was evaluated as follows. "B" was defined as unacceptable, and "A" was defined as acceptable. The results are presented in Tables 3A to 3C.

Black oxide was observed: "B"
Black oxide was not observed: "A"

As presented in Tables 1A to 3C, in Nos. 10 to 48 and 57, the cooling conditions during manufacture were appropriate, and the average chemical composition and the metallurgical structure of the metallic coating layer satisfied the ranges of the present invention. Therefore, Nos. 10 to 48 and 57 had an excellent electrode life property in spot welding during spot welding, had a wide suitable welding current range during spot welding, and had excellent corrosion resistance of a spot-welding portion. Note that the eutectic structure in Tables 3A to 3C is a total of a [ternary eutectic structure of Al/MgZn$_2$/Zn] and a [binary eutectic structure of MgZn$_2$/Zn]. In addition, the Zn$_2$Mg phase in Tables 3A to 3C is an MgZn$_2$ phase.

As presented in Tables 1A to 3C, in Nos. 1 to 9, the average chemical composition of the metallic coating layer was out of the scope of the present invention, and in some metallic coated steels, the metallurgical structure was out of the scope of the present invention. For this reason, the electrode life property in spot welding was reduced, the suitable welding current range during spot welding was narrowed, and the corrosion resistance of the spot-welding portion was also reduced.

As presented in Tables 1A to 3C, in Nos. 49 to 53, since the cooling conditions during manufacturing were inappropriate, the metallurgical structure was out of the scope of the present invention. For this reason, the electrode life property in spot welding was reduced, the suitable welding current range during spot welding was narrowed, and the corrosion resistance of the spot-welding portion was also reduced.

As presented in Tables 1A to 3C, in Nos. 54, 55, and 56, the cooling conditions during manufacture were inappropriate, the average chemical composition of the metallic coating layer was out of the scope of the invention, and the metallurgical structure of the metallic coating layer was out of the scope of the present invention. For this reason, the electrode life property in spot welding was reduced, the suitable welding current range during spot welding was narrowed, and the corrosion resistance of the spot-welding portion was also reduced.

TABLE 1A

| No. | | Manufacturing method | Bath temperature ° C. | Chemical composition (mass %) Remainder: 65% or more of Zn and impurities | | | | | | | | | | | | | | | |
|---|---|---|---|---|---|---|---|---|---|---|---|---|---|---|---|---|---|---|---|
| | | | | Al | Mg | Sn | Bi | In | Ca | Sc | Y | La | Ce | Sr | Si | B | P | Li | Na |
| 1 | Comparative Example | A | 500 | 0.1 | 4.5 | 0.1 | 0 | 0 | 0.20 | 0 | 0 | 0 | 0 | 0 | 0.10 | 0 | 0 | 0 | 0 |
| 2 | Comparative Example | B | 500 | 4.1 | 4.1 | 0 | 0 | 0 | 0.20 | 0 | 0.20 | 0 | 0 | 0 | 0.20 | 0 | 0 | 0 | 0 |
| 3 | Comparative Example | A | 500 | 3.5 | 4.0 | 0 | 0.2 | 0 | 0.40 | 0 | 0 | 0.40 | 0 | 0 | 0 | 0 | 0 | 0 | 0 |
| 4 | Comparative Example | F | 600 | 3.8 | 12.5 | 0 | 0 | 0.1 | 0.30 | 0 | 0 | 0 | 0 | 0 | 0.50 | 0 | 0 | 0 | 0 |
| 5 | Comparative Example | A | 500 | 0.1 | 3.0 | 0 | 0 | 0 | 0.50 | 0.10 | 0 | 0 | 0 | 0 | 0.20 | 0 | 0 | 0 | 0 |

TABLE 1A-continued

| No. | | Manu-facturing method | Bath temper-ature ° C. | Chemical composition (mass %) Remainder: 65% or more of Zn and impurities | | | | | | | | | | | | | | |
|---|---|---|---|---|---|---|---|---|---|---|---|---|---|---|---|---|---|---|
| | | | | Al | Mg | Sn | Bi | In | Ca | Sc | Y | La | Ce | Sr | Si | B | P | Li | Na |
| 6 | Comparative Example | A | 600 | <u>6.0</u> | <u>13.0</u> | 1.5 | 0 | 0 | 0.50 | 0 | 0 | 0 | 0.10 | 0 | 0.80 | 0 | 0 | 0 | 0 |
| 7 | Comparative Example | A | 550 | 1.5 | 4.5 | 0 | 0 | 0 | <u>0.10</u> | 0 | 0 | 0 | 0 | 0 | 0 | 0 | 0 | 0 | 0 |
| 8 | Comparative Example | A | 600 | 3.0 | 8.0 | <u>3.0</u> | 0 | 0 | <u>3.00</u> | 0 | 0 | 0 | 0 | 0 | 0.30 | 0 | 0 | 0 | 0 |
| 9 | Comparative Example | <u>B</u> | 500 | 3.1 | 6.0 | 0 | 0 | <u>1.5</u> | 0.30 | 0.20 | 0 | 0 | 0 | 0.10 | 0.30 | 0 | 0 | 0 | 0 |
| 10 | Example | A | 550 | 0.2 | 4.1 | 0 | 0 | 0 | 2.50 | 0 | 0 | 0 | 0 | 0 | 0.50 | 0 | 0.05 | 0 | 0 |
| 11 | Example | A-3 | 600 | 0.5 | 5.0 | 2.5 | 0 | 0 | 2.00 | 0 | 0 | 0 | 0.10 | 0 | 0.20 | 0 | 0 | 0 | 0.01 |
| 12 | Example | A-2 | 600 | 0.5 | 7.0 | 0 | 0 | 0.2 | 2.70 | 0 | 0.30 | 0.10 | 0.30 | 0.50 | 0 | 0 | 0 | 0 | 0 |
| 13 | Example | A | 600 | 0.4 | 6.0 | 0 | 0.3 | 0 | 2.50 | 0 | 0 | 0.20 | 0 | 0 | 0 | 0.30 | 0 | 0 | 0 |
| 14 | Example | A-4 | 550 | 0.8 | 4.2 | 0.2 | 0 | 0 | 1.50 | 0 | 0.20 | 0 | 0 | 0 | 0.30 | 0 | 0 | 0 | 0 |
| 15 | Example | A | 550 | 1.1 | 5.2 | 0 | 0 | 0 | 1.20 | 0 | 0 | 0 | 0 | 0.30 | 0 | 0 | 0 | 0 | 0 |
| 16 | Example | A | 550 | 1.0 | 5.5 | 0 | 0 | 0 | 1.40 | 0 | 0.30 | 0.30 | 0 | 0 | 0.10 | 0 | 0 | 0 | 0 |
| 17 | Example | A-2 | 600 | 1.1 | 6.2 | 0.4 | 0 | 0 | 1.50 | 0 | 0 | 0 | 0.20 | 0.30 | 0.40 | 0 | 0 | 0 | 0 |
| 18 | Example | A | 550 | 1.4 | 4.5 | 0 | 0 | 0 | 0.50 | 0 | 0.10 | 0 | 0.10 | 0 | 0.60 | 0 | 0 | 0 | 0 |

The underlined value indicates being out of the scope of the present invention or out of preferable manufacturing conditions.

TABLE 1B

| No. | | Manu-facturing method | Bath temper-ature ° C. | Chemical composition (mass %) Remainder: 65% or more of Zn and impurities | | | | | | | | | | | | | | |
|---|---|---|---|---|---|---|---|---|---|---|---|---|---|---|---|---|---|---|
| | | | | Al | Mg | Sn | Bi | In | Ca | Sc | Y | La | Ce | Sr | Si | B | P | Li | Na |
| 19 | Example | A | 550 | 1.5 | 5.0 | 0 | 0 | 0.5 | 0.80 | 0 | 0 | 0 | 0 | 0 | 0.20 | 0 | 0 | 0 | 0 |
| 20 | Example | A | 550 | 1.5 | 5.5 | 0 | 0 | 0 | 1.10 | 0 | 0.10 | 0 | 0 | 0 | 0.10 | 0 | 0 | 0 | 0 |
| 21 | Example | A-2 | 600 | 1.6 | 6.0 | 0 | 0.5 | 0 | 1.60 | 0.10 | 0 | 0 | 0 | 0 | 0.10 | 0 | 0 | 0 | 0 |
| 22 | Example | A | 550 | 1.8 | 4.6 | 0.5 | 0 | 0 | 0.30 | 0 | 0 | 0 | 0 | 0.10 | 0.30 | 0 | 0 | 0.01 | 0 |
| 23 | Example | A | 550 | 1.9 | 5.5 | 0 | 0 | 0 | 0.60 | 0 | 0 | 0 | 0 | 0 | 0.20 | 0 | 0 | 0 | 0 |
| 24 | Example | A | 550 | 1.9 | 6.1 | 0 | 0 | 0.8 | 0.60 | 0.10 | 0 | 0.10 | 0.10 | 0 | 0 | 0 | 0 | 0 | 0 |
| 25 | Example | A | 600 | 2.0 | 7.0 | 0 | 0 | 0 | 1.00 | 0 | 0.10 | 0 | 0 | 0.10 | 0.50 | 0 | 0 | 0 | 0 |
| 26 | Example | A | 600 | 2.1 | 7.4 | 0 | 0 | 0 | 1.90 | 0 | 0 | 0 | 0 | 0 | 0.20 | 0 | 0 | 0 | 0 |
| 27 | Example | A-5 | 600 | 2.0 | 8.1 | 1.1 | 0 | 0 | 2.10 | 0 | 0 | 0 | 0 | 0 | 0.30 | 0 | 0 | 0 | 0 |
| 28 | Example | A | 550 | 2.5 | 4.4 | 0 | 0 | 0 | 0.40 | 0 | 0 | 0.20 | 0 | 0 | 0 | 0 | 0 | 0 | 0 |
| 29 | Example | A | 550 | 2.6 | 4.8 | 0 | 0.1 | 0 | 0.20 | 0 | 0 | 0 | 0 | 0 | 1.20 | 0 | 0 | 0 | 0 |
| 30 | Example | A | 550 | 2.5 | 5.9 | 0 | 0 | 0 | 0.80 | 0.20 | 0 | 0 | 0 | 0 | 0.10 | 0 | 0 | 0 | 0 |
| 31 | Example | A | 550 | 2.6 | 6.9 | 0 | 0 | 0 | 0.30 | 0 | 0 | 0 | 0 | 0 | 0.60 | 0 | 0 | 0 | 0 |
| 32 | Example | A-4 | 600 | 2.4 | 8.0 | 0.1 | 0 | 0.4 | 0.90 | 0 | 0.20 | 0 | 0 | 0.10 | 0.30 | 0 | 0 | 0 | 0 |
| 33 | Example | A-2 | 600 | 2.8 | 9.1 | 0 | 0 | 0 | 1.50 | 0 | 0 | 0 | 0.20 | 0 | 0.10 | 0 | 0 | 0 | 0 |
| 34 | Example | A | 500 | 3.0 | 4.3 | 0 | 0 | 0 | 0.50 | 0 | 0 | 0 | 0 | 0 | 0.30 | 0 | 0 | 0.05 | 0 |
| 35 | Example | A-3 | 550 | 3.1 | 5.2 | 0 | 0 | 0 | 1.40 | 0 | 0 | 0 | 0 | 0 | 0.40 | 0 | 0 | 0 | 0 |
| 36 | Example | A | 550 | 2.9 | 6.3 | 0 | 0 | 0.1 | 0.90 | 0 | 0 | 0 | 0 | 0 | 0 | 0 | 0 | 0 | 0 |

The underlined value indicates being out of the scope of the present invention or out of preferable manufacturing conditions.

TABLE 1C

| No. | | Manu-facturing method | Bath temper-ature ° C. | Chemical composition (mass %) Remainder: 65% or more of Zn and impurities | | | | | | | | | | | | | | |
|---|---|---|---|---|---|---|---|---|---|---|---|---|---|---|---|---|---|---|
| | | | | Al | Mg | Sn | Bi | In | Ca | Sc | Y | La | Ce | Sr | Si | B | P | Li | Na |
| 37 | Example | A | 550 | 3.0 | 7.5 | 0 | 0 | 0 | 0.20 | 0 | 0 | 0 | 0 | 0 | 1.40 | 0 | 0.10 | 0 | 0 |
| 38 | Example | A | 500 | 3.4 | 4.5 | 0 | 0 | 0 | 0.20 | 0 | 0 | 0 | 0 | 0 | 0.60 | 0 | 0 | 0 | 0 |
| 39 | Example | A | 500 | 3.5 | 5.0 | 1.5 | 0 | 0 | 0.30 | 0 | 0 | 0 | 0 | 0 | 1.00 | 0 | 0 | 0 | 0 |
| 40 | Example | A | 550 | 3.5 | 6.6 | 0 | 0.8 | 0 | 0.80 | 0 | 0 | 0 | 0 | 0 | 0.40 | 0 | 0 | 0 | 0 |
| 41 | Example | A-3 | 550 | 3.5 | 7.1 | 0 | 0 | 0 | 1.10 | 0 | 0 | 0 | 0 | 0 | 0.10 | 0 | 0 | 0 | 0 |
| 42 | Example | A | 550 | 3.5 | 9.5 | 0.3 | 0 | 0 | 0.40 | 0 | 0 | 0 | 0 | 0 | 0 | 0 | 0 | 0 | 0 |

TABLE 1C-continued

| No. | Manufacturing method | Bath temperature ° C. | Chemical composition (mass %) Remainder: 65% or more of Zn and impurities | | | | | | | | | | | | | | | |
|---|---|---|---|---|---|---|---|---|---|---|---|---|---|---|---|---|---|---|
| | | | Al | Mg | Sn | Bi | In | Ca | Sc | Y | La | Ce | Sr | Si | B | P | Li | Na |
| 43 | Example A | 550 | 3.9 | 5.2 | 0 | 0 | 0 | 0.20 | 0.10 | 0 | 0 | 0 | 0 | 1.80 | 0 | 0 | 0 | 0 |
| 44 | Example A-3 | 550 | 3.8 | 6.8 | 0.2 | 0 | 0 | 0.50 | 0 | 0 | 0.10 | 0 | 0 | 0.10 | 0 | 0 | 0 | 0 |
| 45 | Example A-4 | 550 | 3.8 | 8.5 | 0 | 0.1 | 0 | 0.40 | 0 | 0 | 0 | 0 | 0 | 0.20 | 0 | 0 | 0 | 0.02 |
| 46 | Example A-5 | 600 | 3.9 | 12.0 | 0.1 | 0.1 | 0 | 1.80 | 0 | 0 | 0 | 0 | 0 | 1.10 | 0 | 0 | 0 | 0 |
| 47 | Example A | 500 | 3.8 | 4.4 | 0 | 0 | 0.1 | 0.20 | 0 | 0 | 0 | 0 | 0 | 0.80 | 0.10 | 0 | 0 | 0 |
| 48 | Example A | 600 | 3.7 | 5.5 | 0.2 | 0.1 | 0 | 0.15 | 0 | 0 | 0 | 0 | 0.05 | 2.40 | 0.10 | 0 | 0 | 0 |
| 49 | Comparative Example | <u>B</u> 550 | 2.5 | 5.0 | 0 | 0.1 | 0 | 0.20 | 0 | 0 | 0.05 | 0 | 0 | 0 | 0 | 0 | 0 | 0 |
| 50 | Comparative Example | <u>C</u> 550 | 3.5 | 4.5 | 0 | 0 | 0.2 | 0.40 | 0 | 0 | 0 | 0 | 0 | 0.20 | 0 | 0 | 0 | 0 |
| 51 | Comparative Example | <u>D</u> 600 | 2.0 | 6.0 | 0.1 | 0 | 0 | 0.50 | 0 | 0.05 | 0 | 0 | 0 | 0.60 | 0 | 0 | 0 | 0 |
| 52 | Comparative Example | <u>B</u> 600 | 1.5 | 11.0 | 0 | 0 | 0 | 0.40 | 0 | 0 | 0 | 0 | 0 | 0 | 0 | 0 | 0 | 0 |
| 53 | Comparative Example | <u>F</u> 600 | 1.9 | 7.0 | 0 | 0 | 0 | 0.50 | 0 | 0 | 0 | 0 | 0 | 1.00 | 0 | 0 | 0 | 0 |
| 54 | Comparative Example | <u>C</u> 550 | <u>6.0</u> | 8.0 | 0.2 | 0 | 0 | 0.40 | 0 | 0 | 0 | 0 | 0 | 0.10 | 0.05 | 0 | 0 | 0 |
| 55 | Comparative Example | <u>D</u> 500 | 1.0 | <u>1.1</u> | 0 | 0 | 0 | <u>0.00</u> | 0 | 0 | 0 | 0 | 0 | 0 | 0 | 0 | 0 | 0 |
| 56 | Comparative Example | <u>E</u> 500 | 2.9 | <u>4.5</u> | 0 | 0 | 0 | 0.20 | 0 | 0 | 0 | 0 | 0 | 0.20 | 0 | 0 | 0 | 0 |
| 57 | Example G | 550 | 1.6 | 5.1 | 0 | 0 | 0 | 0.40 | 0 | 0 | 0.1 | 0.2 | 0.05 | 0 | 0 | 0 | 0 | 0 |

The underlined value indicates being out of the scope of the present invention or out of preferable manufacturing conditions.

TABLE 2A

| No. | Chemical composition (mass %) Remainder: 65% or more of Zn and impurities | | | | | | | | | | | | | | | | Left side of formula (1)-Mg |
|---|---|---|---|---|---|---|---|---|---|---|---|---|---|---|---|---|---|
| | K | Cr | Ti | Ni | Co | V | Nb | Cu | Mn | Mo | W | Zr | Fe | Ag | Sb | Pb | |
| 1 Comparative Example | 0 | 0 | 0 | 0 | 0 | 0 | 0 | 0 | 0 | 0 | 0 | 0 | 0.2 | 0 | 0 | 0 | 3.85 |
| 2 Comparative Example | 0 | 0 | 0 | 0 | 0 | 0 | 0 | 0 | 0 | 0 | 0 | 0 | 0.4 | 0 | 0 | 0 | 6.75 |
| 3 Comparative Example | 0 | 0 | 0 | 0 | 0 | 0 | 0 | 0 | 0 | 0 | 0 | 0 | 0.4 | 0 | 0 | 0 | 5.95 |
| 4 Comparative Example | 0 | 0 | 0 | 0 | 0 | 0 | 0 | <u>3.0</u> | 0 | 0 | 0 | 0 | 0.4 | 0 | 0 | 0 | −2.40 |
| 5 Comparative Example | 0 | 0 | 0 | 0 | 0 | 0 | 0 | 0 | 0 | 0 | 0 | 0 | 0.2 | 0 | 0 | 0 | −1.75 |
| 6 Comparative Example | 0 | 0 | 0 | 0 | 0 | 0 | 0 | 0.5 | 0 | 0 | 0 | 0 | 0.5 | 0 | 0 | 0 | 3.10 |
| 7 Comparative Example | 0 | 0 | 0 | 0 | 0 | 0 | 0 | 0 | 0 | 0 | 0 | 0 | 0.3 | 0 | 0 | 0 | −0.55 |
| 8 Comparative Example | 0 | 0 | 0 | 0 | 0 | 0 | 0 | 0 | 0 | 0 | 0 | 0 | 0.4 | 0 | 0 | 0 | 5.50 |
| 9 Comparative Example | 0 | 0 | 0 | 0 | 0 | 0 | 0 | 0 | 0 | 0 | 0 | 0 | 0.4 | 0 | 0 | 0 | 2.45 |
| 10 Example | 0 | 0 | 0 | 0 | 0 | 0 | 0 | 0 | 0 | 0 | 0 | 0 | 0.2 | 0 | 0 | 0 | 1.40 |
| 11 Example | 0 | 0 | 0 | 0 | 0 | 0 | 0 | 0 | 0 | 0 | 0 | 0 | 0.2 | 0 | 0 | 0 | 0.35 |
| 12 Example | 0 | 0 | 0 | 0 | 0 | 0 | 0 | 0 | 0 | 0 | 0 | 0 | 0.2 | 0 | 0 | 0 | 0.45 |
| 13 Example | 0 | 0 | 0.10 | 0 | 0 | 0 | 0 | 0 | 0 | 0 | 0.20 | 0 | 0.2 | 0 | 0 | 0 | 0.20 |
| 14 Example | 0 | 0 | 0 | 0 | 0.10 | 0 | 0 | 0 | 0 | 0 | 0 | 0 | 0.2 | 0 | 0 | 0 | 1.00 |
| 15 Example | 0 | 0 | 0 | 0 | 0 | 0 | 0 | 0 | 0 | 0 | 0 | 0 | 0.3 | 0 | 0 | 0 | 0.25 |
| 16 Example | 0 | 0 | 0 | 0 | 0 | 0 | 0 | 0 | 0 | 0 | 0 | 0 | 0.3 | 0 | 0 | 0 | 0.40 |
| 17 Example | 0 | 0 | 0 | 0 | 0 | 0 | 0 | 0 | 0 | 0 | 0 | 0 | 0.3 | 0 | 0 | 0 | 0.05 |
| 18 Example | 0 | 0 | 0 | 0 | 0 | 0 | 0 | 0 | 0.20 | 0 | 0 | 0 | 0.3 | 0 | 0 | 0 | 0.20 |

The underlined value indicates being out of the scope of the present invention or out of preferable manufacturing conditions.

TABLE 2B

Chemical composition (mass %) Remainder: 65% or more of Zn and impurities

| No. | | K | Cr | Ti | Ni | Co | V | Nb | Cu | Mn | Mo | W | Zr | Fe | Ag | Sb | Pb | Left side of formula (1)-Mg |
|---|---|---|---|---|---|---|---|---|---|---|---|---|---|---|---|---|---|---|
| 19 | Example | 0.01 | 0 | 0 | 0 | 0 | 0 | 0 | 0.1 | 0 | 0 | 0 | 0 | 0.3 | 0 | 0 | 0 | 0.35 |
| 20 | Example | 0 | 0 | 0 | 0 | 0.20 | 0 | 0 | 0 | 0 | 0 | 0 | 0 | 0.3 | 0.1 | 0 | 0 | 0.55 |
| 21 | Example | 0 | 0 | 0 | 0 | 0 | 0 | 0 | 0 | 0 | 0 | 0 | 0 | 0.3 | 0 | 0 | 0 | 1.20 |
| 22 | Example | 0 | 0 | 0 | 0 | 0 | 0 | 0 | 0 | 0 | 0 | 0 | 0 | 0.3 | 0 | 0 | 0 | 0.60 |
| 23 | Example | 0 | 0 | 0 | 0 | 0 | 0.20 | 0 | 0 | 0 | 0 | 0 | 0 | 0.3 | 0 | 0 | 0 | 0.45 |
| 24 | Example | 0 | 0 | 0 | 0 | 0 | 0 | 0 | 0 | 0 | 0 | 0 | 0.20 | 0.3 | 0 | 0 | 0 | 0.05 |
| 25 | Example | 0 | 0 | 0 | 0 | 0 | 0 | 0 | 0 | 0 | 0.10 | 0 | 0 | 0.3 | 0 | 0 | 0 | 0.20 |
| 26 | Example | 0 | 0 | 0 | 0.2 | 0 | 0 | 0 | 0 | 0 | 0 | 0 | 0 | 0.3 | 0 | 0 | 0 | 1.65 |
| 27 | Example | 0 | 0 | 0 | 0 | 0 | 0 | 0 | 0 | 0 | 0 | 0 | 0 | 0.3 | 0 | 0 | 0 | 1.10 |
| 28 | Example | 0 | 0 | 0 | 0 | 0 | 0 | 0 | 0 | 0 | 0 | 0 | 0 | 0.3 | 0 | 0 | 0 | 2.85 |
| 29 | Example | 0 | 0.10 | 0 | 0 | 0 | 0.10 | 0 | 0 | 0 | 0 | 0 | 0 | 0.3 | 0 | 0 | 0 | 2.10 |
| 30 | Example | 0 | 0 | 0 | 0 | 0 | 0 | 0 | 0 | 0 | 0 | 0 | 0 | 0.3 | 0 | 0.3 | 0 | 1.95 |
| 31 | Example | 0 | 0 | 0 | 0 | 0 | 0 | 0 | 0.5 | 0 | 0 | 0.10 | 0 | 0.3 | 0 | 0 | 0 | 0.20 |
| 32 | Example | 0.03 | 0 | 0 | 0 | 0 | 0 | 0 | 0 | 0 | 0 | 0 | 0 | 0.3 | 0 | 0 | 0 | 0.10 |
| 33 | Example | 0 | 0 | 0 | 0 | 0 | 0 | 0 | 0 | 0 | 0.20 | 0 | 0 | 0.3 | 0 | 0 | 0 | 1.10 |
| 34 | Example | 0 | 0 | 0 | 0 | 0 | 0 | 0 | 0 | 0 | 0 | 0 | 0 | 0.4 | 0 | 0 | 0 | 4.20 |
| 35 | Example | 0 | 0 | 0 | 0 | 0 | 0 | 0 | 0 | 0 | 0 | 0 | 0 | 0.4 | 0 | 0 | 0 | 5.35 |
| 36 | Example | 0 | 0 | 0 | 0 | 0 | 0 | 0.10 | 0 | 0 | 0 | 0 | 0 | 0.3 | 0 | 0 | 0 | 2.75 |

The underlined value indicates being out of the scope of the present invention or out of preferable manufacturing conditions.

TABLE 2C

Chemical composition (mass %) Remainder: 65% or more of Zn and impurities

| No. | | K | Cr | Ti | Ni | Co | V | Nb | Cu | Mn | Mo | W | Zr | Fe | Ag | Sb | Pb | Left side of formula (1)-Mg |
|---|---|---|---|---|---|---|---|---|---|---|---|---|---|---|---|---|---|---|
| 37 | Example | 0 | 0 | 0 | 0 | 0 | 0 | 0 | 0 | 0 | 0 | 0 | 0 | 0.4 | 0 | 0 | 0 | 0.40 |
| 38 | Example | 0 | 0 | 0 | 0 | 0 | 0 | 0 | 0 | 0 | 0 | 0 | 0 | 0.4 | 0 | 0 | 0 | 4.40 |
| 39 | Example | 0 | 0 | 0 | 0 | 0 | 0 | 0 | 0 | 0 | 0 | 0 | 0 | 0.4 | 0 | 0 | 0 | 4.35 |
| 40 | Example | 0 | 0 | 0 | 0 | 0 | 0 | 0 | 0 | 0 | 0 | 0 | 0.10 | 0.4 | 0 | 0 | 0 | 3.75 |
| 41 | Example | 0 | 0 | 0.2 | 0 | 0 | 0 | 0 | 0 | 0 | 0 | 0 | 0 | 0.4 | 0 | 0 | 0 | 3.85 |
| 42 | Example | 0 | 0 | 0 | 0 | 0 | 0 | 0.20 | 0 | 0 | 0 | 0 | 0 | 0.4 | 0 | 0 | 0 | 0.05 |
| 43 | Example | 0 | 0 | 0 | 0 | 0 | 0 | 0 | 0 | 0 | 0 | 0 | 0 | 0.4 | 0 | 0 | 0 | 4.95 |
| 44 | Example | 0 | 0 | 0 | 0.1 | 0 | 0 | 0 | 0 | 0 | 0 | 0 | 0 | 0.4 | 0 | 0 | 0 | 3.80 |
| 45 | Example | 0 | 0 | 0 | 0 | 0 | 0 | 0 | 0 | 0 | 0 | 0 | 0 | 0.4 | 0 | 0 | 0 | 1.80 |
| 46 | Example | 0 | 0 | 0 | 0 | 0 | 0 | 0 | 0 | 0 | 0 | 0 | 0 | 0.4 | 0 | 0 | 0 | 1.35 |
| 47 | Example | 0 | 0 | 0 | 0 | 0 | 0 | 0 | 0 | 0 | 0 | 0 | 0 | 0.4 | 0.5 | 0 | 0.3 | 5.50 |
| 48 | Example | 0 | 0 | 0 | 0 | 0 | 0 | 0 | 0 | 0 | 0 | 0 | 0 | 0.4 | 0.5 | 0 | 0 | 4.10 |
| 49 | Comparative Example | 0 | 0 | 0 | 0 | 0 | 0 | 0 | 0 | 0 | 0 | 0 | 0 | 0.3 | 0 | 0 | 0 | 1.70 |
| 50 | Comparative Example | 0 | 0.15 | 0 | 0 | 0 | 0 | 0 | 0 | 0 | 0 | 0 | 0 | 0.4 | 0 | 0 | 0 | 5.05 |
| 51 | Comparative Example | 0 | 0 | 0 | 0 | 0 | 0 | 0 | 0 | 0 | 0 | 0 | 0 | 0.3 | 0 | 0 | 0 | 0.05 |
| 52 | Comparative Example | 0 | 0 | 0 | 0 | 0 | 0 | 0 | 0 | 0 | 0 | 0 | 0 | 0.3 | 0 | 0 | 0 | -6.45 |
| 53 | Comparative Example | 0 | 0 | 0 | 0 | 0 | 0 | 0 | 0 | 0 | 0 | 0 | 0 | 0.3 | 0 | 0 | 0 | -1.25 |
| 54 | Comparative Example | 0 | 0 | 0 | 0 | 0 | 0 | 0 | 0 | 0 | 0 | 0 | 0 | 0.5 | 0 | 0 | 0 | 7.80 |
| 55 | Comparative Example | 0 | 0 | 0 | 0 | 0 | 0 | 0 | 0 | 0 | 0 | 0 | 0 | 0.3 | 0 | 0 | 0 | 1.40 |
| 56 | Comparative Example | 0 | 0 | 0 | 0 | 0 | 0 | 0 | 0 | 0 | 0.10 | 0 | 0 | 0.3 | 0 | 0 | 0 | 3.15 |
| 57 | Example | 0 | 0.05 | 0 | 0 | 0 | 0 | 0 | 0 | 0 | 0 | 0 | 0 | 0.3 | 0 | 0 | 0 | 0.05 |

The underlined value indicates being out of the scope of the present invention or out of preferable manufacturing conditions.

TABLE 3A

| No. | | Metallurgical structure (area %) | | | | | | $CaZn_{13}$ diameter (μm) | Welding current range | Electrode life property in spot welding | Corrosion resistance around spot-welding portion | Bath stability |
|---|---|---|---|---|---|---|---|---|---|---|---|---|
| | | $Zn_2Mg$ phase | Al—Zn phase | Al phase | Eutectic structure | $CaZn_{13}$ phase | Remainder | | | | | |
| 1 | Comparative Example | 10 | 0 | 0 | 84.0 | 1.0 | 5 | 10 | A | A | B | B |
| 2 | Comparative Example | 10 | 0 | 5 | 79.5 | 0.5 | 5 | 5 | B | B | B | A |
| 3 | Comparative Example | 10 | 5 | 0 | 78.0 | 2.0 | 5 | 10 | B | B | B | A |
| 4 | Comparative Example | 45 | 5 | 0 | 44.5 | 0.5 | 5 | 5 | B | B | B | B |
| 5 | Comparative Example | 5 | 0 | 0 | 78.0 | 2.0 | 15 | 10 | B | B | B | B |

TABLE 3A-continued

| No. | | Metallurgical structure (area %) | | | | | CaZn$_{13}$ diameter (μm) | Welding current range | Electrode life property in spot welding | Corrosion resistance around spot-welding portion | Bath stability |
|---|---|---|---|---|---|---|---|---|---|---|---|
| | | Zn$_2$Mg phase | Al—Zn phase | Al phase | Eutectic structure | CaZn$_{13}$ phase | Remainder | | | | | |
| 6 | Comparative Example | <u>45</u> | 15 | 0 | 34.5 | 0.5 | 5 | 5 | B | B | B | A |
| 7 | Comparative Example | <u>10</u> | 0 | 0 | 84.5 | <u>0.5</u> | 5 | 5 | B | B | B | B |
| 8 | Comparative Example | 30 | 5 | 0 | 45.5 | <u>14.5</u> | 5 | 25 | B | B | B | B |
| 9 | Comparative Example | 20 | 5 | 0 | 69.0 | 1.0 | 5 | 5 | B | B | B | A |
| 10 | Example | 10 | 0 | 0 | 73.5 | 11.5 | 5 | 30 | S | AAA | AA | A |
| 11 | Example | 15 | 0 | 0 | 70.5 | 9.5 | 5 | 25 | S | AAA | AAA | A |
| 12 | Example | 25 | 0 | 0 | 57.5 | 12.5 | 5 | 30 | S | S | AAA | A |
| 13 | Example | 20 | 0 | 0 | 62.5 | 12.5 | 5 | 30 | AA | AAA | AAA | A |
| 14 | Example | 10 | 0 | 0 | 78.0 | 7.0 | 5 | 25 | S | AAA | AAA | A |
| 15 | Example | 15 | 0 | 0 | 74.0 | 6.0 | 5 | 25 | AA | AAA | AA | A |
| 16 | Example | 15 | 0 | 0 | 73.0 | 7.0 | 5 | 25 | S | AAA | AA | A |
| 17 | Example | 20 | 0 | 0 | 68.5 | 6.5 | 5 | 25 | S | S | AAA | A |
| 18 | Example | 10 | 0 | 0 | 84.0 | 1.0 | 5 | 15 | S | AA | A | A |

The underlined value indicates being out of the scope of the present invention.

TABLE 3B

| No. | | Metallurgical structure (area %) | | | | | CaZn$_{13}$ diameter (μm) | Welding current range | Electrode life property in spot welding | Corrosion resistance around spot-welding portion | Bath stability |
|---|---|---|---|---|---|---|---|---|---|---|---|
| | | Zn$_2$Mg phase | Al—Zn phase | Al phase | Eutectic structure | CaZn$_{13}$ phase | Remainder | | | | | |
| 19 | Example | 15 | 0 | 0 | 76.5 | 3.5 | 5 | 20 | S | AA | AA | A |
| 20 | Example | 15 | 0 | 0 | 74.5 | 5.5 | 5 | 25 | S | AAA | AA | A |
| 21 | Example | 20 | 0 | 0 | 67.0 | 8.0 | 5 | 25 | S | S | AAA | A |
| 22 | Example | 10 | 0 | 0 | 84.0 | 1.0 | 5 | 15 | S | AA | AAA | A |
| 23 | Example | 15 | 0 | 0 | 77.5 | 2.5 | 5 | 20 | S | AA | A | A |
| 24 | Example | 20 | 0 | 0 | 72.0 | 3.0 | 5 | 20 | AA | AAA | AA | A |
| 25 | Example | 25 | 0 | 0 | 66.0 | 4.0 | 5 | 20 | S | AAA | A | A |
| 26 | Example | 25 | 0 | 0 | 61.0 | 9.0 | 5 | 25 | S | S | A | A |
| 27 | Example | 25 | 0 | 0 | 55.0 | 10.0 | 5 | 30 | S | S | S | A |
| 28 | Example | 30 | 5 | 0 | 78.0 | 2.0 | 5 | 15 | AA | AAA | A | A |
| 29 | Example | 10 | 5 | 0 | 79.0 | 1.0 | 5 | 15 | S | AA | AA | A |
| 30 | Example | 10 | 5 | 0 | 66.0 | 4.0 | 5 | 20 | S | AAA | A | A |
| 31 | Example | 20 | 5 | 0 | 64.0 | 1.0 | 5 | 15 | S | AAA | A | A |
| 32 | Example | 30 | 5 | 0 | 56.0 | 4.0 | 5 | 20 | S | AAA | AAA | A |
| 33 | Example | 35 | 5 | 0 | 47.5 | 7.5 | 5 | 25 | S | S | AAA | A |
| 34 | Example | 10 | 5 | 0 | 78.0 | 2.0 | 5 | 15 | S | S | A | A |
| 35 | Example | 15 | 5 | 0 | 69.0 | 6.0 | 5 | 25 | S | S | AA | A |
| 36 | Example | 20 | 5 | 0 | 65.5 | 4.5 | 5 | 20 | AA | AAA | AA | A |

The underlined value indicates being out of the scope of the present invention.

TABLE 3C

| No. | | Metallurgical structure (area %) | | | | | CaZn$_{13}$ diameter (μm) | Welding current range | Electrode life property in spot welding | Corrosion resistance around spot-welding portion | Bath stability |
|---|---|---|---|---|---|---|---|---|---|---|---|
| | | Zn$_2$Mg phase | Al—Zn phase | Al phase | Eutectic structure | CaZn$_{13}$ phase | Remainder | | | | | |
| 37 | Example | 25 | 5 | 0 | 64.0 | 1.0 | 5 | 15 | S | AAA | A | A |
| 38 | Example | 10 | 10 | 0 | 74.0 | 1.0 | 5 | 15 | S | AA | A | A |
| 39 | Example | 15 | 10 | 0 | 69.0 | 1.0 | 5 | 15 | S | AAA | AA | A |
| 40 | Example | 20 | 10 | 0 | 62.0 | 3.0 | 5 | 20 | S | AAA | AA | A |
| 41 | Example | 25 | 10 | 0 | 54.5 | 5.5 | 5 | 25 | S | S | AA | A |
| 42 | Example | 30 | 10 | 0 | 53.0 | 2.0 | 5 | 15 | AA | AAA | AAA | A |
| 43 | Example | 15 | 10 | 0 | 69.0 | 1.0 | 5 | 15 | S | AAA | A | A |
| 44 | Example | 20 | 10 | 0 | 62.5 | 2.5 | 5 | 20 | S | AAA | AAA | A |
| 45 | Example | 30 | 10 | 0 | 53.5 | 1.5 | 5 | 15 | S | AAA | AAA | A |
| 46 | Example | 40 | 10 | 0 | 39.5 | 5.5 | 5 | 25 | S | S | S | A |
| 47 | Example | 10 | 10 | 0 | 74.0 | 1.0 | 5 | 15 | S | AA | A | A |

TABLE 3C-continued

| | | Metallurgical structure (area %) | | | | | CaZn₁₃ diameter (μm) | Welding current range | Electrode life property in spot welding | Corrosion resistance around spot-welding portion | Bath stability |
|---|---|---|---|---|---|---|---|---|---|---|---|
| No. | | Zn₂Mg phase | Al—Zn phase | Al phase | Eutectic structure | CaZn₁₃ phase | Remainder | | | | | |
| 48 | Example | 10 | 10 | 0 | 74.0 | 1.0 | 5 | 15 | S | AA | A | A |
| 49 | Comparative Example | 15 | 5 | 0 | 74.1 | 0.9 | 5 | 10 | B | B | B | A |
| 50 | Comparative Example | 10 | 0 | 10 | 73.5 | 1.5 | 5 | 15 | B | B | A | A |
| 51 | Comparative Example | 15 | 0 | 7.5 | 72.0 | 0.5 | 5 | 5 | B | B | B | A |
| 52 | Comparative Example | 30 | 0 | 0 | 64.5 | 0.5 | 5 | 5 | B | B | B | B |
| 53 | Comparative Example | 30 | 0 | 0 | 64.5 | 0.5 | 5 | 10 | B | B | B | B |
| 54 | Comparative Example | 30 | 5 | 15 | 43.0 | 2.0 | 5 | 15 | B | B | B | A |
| 55 | Comparative Example | 0 | 0 | 0 | 35.0 | 0 | 65 | — | B | B | B | A |
| 56 | Comparative Example | 10 | 5 | 10 | 69.0 | 1.0 | 5 | 5 | B | B | B | A |
| 57 | Example | 10 | 5 | 0 | 35.0 | 2.0 | 5 | 5 | AA | A | A | A |

The underlined value indicates being out of the scope of the present invention.

FIELD OF INDUSTRIAL APPLICATION

According to the present invention, it is possible to suppress occurrence of surface unevenness during draw-forming and to obtain a steel sheet having high strength.

The invention claimed is:

1. A metallic coated steel comprising:
a steel material; and
a metallic coating layer formed on a surface of the steel material,
wherein the metallic coating layer has an average chemical composition including, in terms of mass %,
Al: 0.2% to less than 4.0%,
Mg: more than 4.0% and less than 12.5%,
Ca: 0.15% to less than 3.00%,
Sn: 0% to less than 3.0%,
Bi: 0% to less than 1.0%,
In: 0% to less than 1.0%,
Sc: 0% to less than 0.50%,
Y: 0% to less than 0.50%,
La: 0% to less than 0.50%,
Ce: 0% to less than 0.50%,
Sr: 0% to less than 0.50%,
Si: 0% to less than 2.50%,
B: 0% to less than 0.50%,
P: 0% to less than 0.50%,
Cr: 0% to less than 0.25%,
Ti: 0% to less than 0.25%,
Ni: 0% to less than 1.0%,
Co: 0% to less than 0.25%,
V: 0% to less than 0.25%,
Nb: 0% to less than 0.25%,
Cu: 0% to less than 1.0%,
Mn: 0% to less than 0.25%,
Mo: 0% to less than 0.25%,
W: 0% to less than 0.25%,
Zr: 0% to less than 0.25%,
Fe: 0% to less than 5.0%,
Ag: 0% to less than 1.0%,
Li: 0% to less than 0.50%,
Na: 0% to less than 0.05%,
K: 0% to less than 0.05%,
Sb: 0% to less than 0.5%,
Pb: 0% to less than 0.5%,
Zn: 65% or more, and
impurities, and
in a cross section of the metallic coating layer in a thickness direction, a metallurgical structure observed in a scanning electron microscope observed visual field contains, in terms of area fraction,
an MgZn₂ phase: 10 to 40%,
an Al—Zn phase: 0 to 15%,
an Al phase: 0 to 5%,
a CaZn₁₃ phase: 1.0 to 15.0%, and
a total of a [ternary eutectic structure of Al/MgZn₂/Zn] and a [binary eutectic structure of MgZn₂/Zn]: 30.0% or more.

2. The metallic coated steel according to claim 1, wherein among the CaZn₁₃ phases of the metallurgical structure in the cross section of the metallic coating layer in the thickness direction, an average circle-equivalent diameter of top 80% CaZn₁₃ phases in descending order of circle-equivalent diameter is 10 μm or more.

3. The metallic coated steel according to claim 1, wherein when a mass concentration % of an element X in the average chemical composition of the metallic coating layer is represented by [X], the average chemical composition of the metallic coating layer satisfies the following formula (1):

$$2.5 \times [Al] + 2 \times [Ca] + [Y] + [Sr] + [La] + [Ce] > [Mg] \tag{1}$$

4. The metallic coated steel according to claim 2, wherein when a mass concentration % of an element X in the average chemical composition of the metallic coating layer is represented by [X], the average chemical composition of the metallic coating layer satisfies the following formula (1):

$$2.5 \times [Al] + 2 \times [Ca] + [Y] + [Sr] + [La] + [Ce] > [Mg] \tag{1}$$

* * * * *